(12) United States Patent
Flynn et al.

(10) Patent No.: US 11,377,798 B2
(45) Date of Patent: Jul. 5, 2022

(54) RE-PULPABLE THERMALLY INSULATED PAPER PRODUCTS AND METHODS OF MAKING AND USING THE SAME

(71) Applicants: Nigel J. Flynn, Flowery Branch, GA (US); Taylor Kopacka Leigh, Alpharetta, GA (US); Jason Lye, Atlanta, GA (US); Terence Edwin Say, Powder Springs, GA (US)

(72) Inventors: Nigel J. Flynn, Flowery Branch, GA (US); Taylor Kopacka Leigh, Alpharetta, GA (US); Jason Lye, Atlanta, GA (US); Terence Edwin Say, Powder Springs, GA (US)

(73) Assignee: TRIPLE POINT INNOVATIONS LLC, Chicago, IL (US)

( * ) Notice: Subject to any disclaimer, the term of this patent is extended or adjusted under 35 U.S.C. 154(b) by 106 days.

(21) Appl. No.: 16/837,129

(22) Filed: Apr. 1, 2020

(65) Prior Publication Data

US 2020/0283959 A1 Sep. 10, 2020

Related U.S. Application Data

(63) Continuation-in-part of application No. 16/590,224, filed on Oct. 1, 2019, now Pat. No. 11,247,446.

(Continued)

(51) Int. Cl.
  *D21H 19/82* (2006.01)
  *B32B 29/00* (2006.01)
  (Continued)

(52) U.S. Cl.
  CPC .......... *D21H 19/58* (2013.01); *B32B 29/005* (2013.01); *B32B 29/08* (2013.01); *B65D 65/42* (2013.01); *B65D 81/3886* (2013.01); *B65D 81/3897* (2013.01); *D21H 19/385* (2013.01); *D21H 19/40* (2013.01); *D21H 19/822* (2013.01); *D21H 21/16* (2013.01); *D21H 27/30* (2013.01);
  (Continued)

(58) Field of Classification Search
  CPC ... B32B 29/005; B32B 29/08; B32B 2255/12; B32B 2255/20; B32B 2307/304; B32B 2307/7265; B32B 2439/70; B65D 65/42; B65D 81/3886; B65D 81/3897; D21H 19/385; D21H 19/40; D21H 19/822; D21H 21/16; D21H 27/30
  See application file for complete search history.

(56) References Cited

U.S. PATENT DOCUMENTS

| 5,155,138 A | 10/1992 | Lundqvist |
| 5,543,186 A | 8/1996 | Andersen et al. |

(Continued)

FOREIGN PATENT DOCUMENTS

| WO | 90/13708 | 11/1990 |
| WO | 99/36618 | 7/1999 |

(Continued)

OTHER PUBLICATIONS

PCT/US2020/053402 International Search Report and Written Opinion, dated Nov. 18, 2020.
(Continued)

*Primary Examiner* — Catherine A. Simone
(74) *Attorney, Agent, or Firm* — Withers & Keys, LLC

(57) ABSTRACT

Paper products with a thermally insulating coating are disclosed. Methods of making and using thermally insulated paper products are also disclosed.

19 Claims, 18 Drawing Sheets

Related U.S. Application Data

(60) Provisional application No. 62/739,735, filed on Oct. 1, 2018.

(51) Int. Cl.
| | |
|---|---|
| *B32B 29/08* | (2006.01) |
| *D21H 19/38* | (2006.01) |
| *D21H 19/58* | (2006.01) |
| *D21H 19/40* | (2006.01) |
| *D21H 21/16* | (2006.01) |
| *D21H 27/30* | (2006.01) |
| *B65D 65/42* | (2006.01) |
| *B65D 81/38* | (2006.01) |

(52) U.S. Cl.
CPC ....... *B32B 2250/26* (2013.01); *B32B 2255/12* (2013.01); *B32B 2255/20* (2013.01); *B32B 2307/304* (2013.01); *B32B 2307/7265* (2013.01); *B32B 2439/70* (2013.01)

(56) References Cited

U.S. PATENT DOCUMENTS

| | | |
|---|---|---|
| 5,580,624 A | 12/1996 | Andersen et al. |
| 5,631,052 A | 5/1997 | Andersen et al. |
| 5,683,772 A | 11/1997 | Andersen et al. |
| 5,705,242 A | 1/1998 | Andersen et al. |
| 5,753,308 A | 5/1998 | Andersen et al. |
| 6,265,040 B1 | 7/2001 | Neale et al. |
| 6,740,373 B1 | 5/2004 | Swoboda et al. |
| 6,919,111 B2 | 7/2005 | Swoboda et al. |
| 2006/0096978 A1 | 5/2006 | Lafferty |
| 2007/0131667 A1 | 6/2007 | Amato |

FOREIGN PATENT DOCUMENTS

| | | |
|---|---|---|
| WO | 2004046463 A2 | 6/2004 |
| WO | 2013/063374 | 5/2013 |
| WO | 2016121372 | 8/2016 |

OTHER PUBLICATIONS

PCT/US2020/053421 International Search Report and Written Opinion, dated Nov. 9, 2020.

PCT/US2019/054121 International Search Report and Written Opinion, dated Jan. 3, 2020.

RE-PULPABLE THERMALLY INSULATED PAPER PRODUCTS AND METHODS OF MAKING AND USING THE SAME

CROSS-REFERENCE TO RELATED APPLICATIONS

This patent application is a continuation-in-part of U.S. Utility patent application Ser. No. 16/590,224 entitled "RE-PULPABLE INSULATED PAPER PRODUCTS AND METHODS OF MAKING AND USING THE SAME," and filed on Oct. 1, 2019, which claims the benefit of priority to U.S. Provisional Patent Application Ser. No. 62/739,735 filed on Oct. 1, 2018 entitled "RE-PULPABLE INSULATED PAPER PRODUCTS AND METHODS OF MAKING AND USING THE SAME," the subject matter of both of which is hereby incorporated by reference in their entirety.

FIELD OF THE INVENTION

The present invention relates generally to insulated paper products. The present invention further relates to methods of making and using insulated paper products.

BACKGROUND OF THE INVENTION

Food sold in fast food restaurants is often wrapped in a low basis weight paper product. The wrapping paper is often treated with a coating to provide wet strength, such as a silicone, or a fluorocarbon, or a wax, and further is often laminated to a thin aluminum foil. The aluminum foil serves several purposes. First, aluminum has a low thermal emissivity, and so the foil layer provides thermal insulation. Second, the foil adds some resiliency to the paper when subjected to hot moisture and lipids, such as vegetable and animal fats, dairy products etc.

While cheap to produce, manufacture, and effective at insulating, such laminated foil paper products also have many disadvantages. Aluminum foil (1) is persistent in the environment as it does not decompose, contributing to long term landfills, (2) is frequently litter that is unsightly and may cause obstruction in the guts of smaller animals when ingested, (3) is not recyclable or repulpable, causing problems if accidentally introduced into a repulping mill, (4) does not burn if the material is incinerated and (5) has been linked to certain neurodegenerative diseases in humans when ingested.

For similar reasons, some paper beverage cups are also difficult to recycle. They are coated with a low molecular weight polyethylene, which causes problems when introduced into the pulp.

What is needed is a highly thermally insulating paper structure that provides one or more of the following benefits: (1) is non-toxic and safe for use with food, (2) is thin and can be supplied to restaurants in roll or sheet format, (3) insulates hot food from cooling, (4) is recyclable by municipal recycling services without separation or segregation from other papers in the waste stream, (5) is biodegradable or biodestructable and therefore ephemeral when released into the environment (6) is able to maintain integrity with condensation formation after wrapping hot food, and (7) is resistant to the penetration of oils and fats.

SUMMARY OF THE INVENTION

The present invention is directed to insulated paper products that (1) insulate food positioned therein and/or surrounded thereby, (2) are biodegradable or biodestructable, recyclable, repulpable, and (3) can be printed and decorated, and (4) are food contact safe. The disclosed insulated paper products utilize a coating that acts in a similar manner to a laminated aluminum foil. Insulating materials included within the coating are coated onto a variety of paper products.

The present invention is directed to paper products coated with a thermally insulating layer. In one exemplary embodiment, the insulated paper product of the present invention comprises an insulated coated paper product comprising one or more paper layers and at least one insulating coating.

In another exemplary embodiment, the insulated paper product of the present invention comprises a low basis weight paper coated on one side with a thermally insulating coating and a repulpable moisture and/or lipid barrier on the other side, wherein at least one of the coatings has a low thermal conductivity and/or a low thermal emissivity.

In another exemplary embodiment, the insulated paper product of the present invention comprises a corrugated integral paper product comprising: a first linerboard layer comprising one or more first coated layers, a second linerboard layer comprising one or more second coated layers, and a fluted paper layer comprising one or more fluted paper layers or a honeycomb layer positioned between the first linerboard layer and the second linerboard layer, wherein (i) the first linerboard layer, (ii) the second linerboard layer, and (iii) the fluted paper layer or the honeycomb layer may each independently comprise insulating material therein or thereon.

In one desired embodiment, the insulated paper product comprises a fully recyclable, re-pulpable, biodegradable, biodestructable, and thermally insulating food wrapping paper product. In another desired embodiment, the insulated paper product comprises a fully recyclable, re-pulpable, biodegradable, biodestructable, and thermally insulated cardboard box.

The present invention is further directed to methods of making insulated paper products. In one exemplary embodiment, the method of making an insulating wrapping paper product comprises: forming a paper sheet comprising one or more layers on a fourdrinier wire, then coating the formed paper layer with a coating with a low thermal conductivity and/or a low thermal emissivity onto the paper layer. In some exemplary embodiments, the method of making an insulating wrapping paper product further comprises coating the formed paper layer with a moisture barrier and/or a grease resistant layer at the size press, and then coating a thin layer of a coating with a low thermal conductivity and/or a low thermal emissivity.

In one exemplary embodiment, the method of making an insulating wrapping paper product comprises: forming a paper sheet comprising one or more layers, then coating the formed paper layer with a moisture barrier and/or a grease resistant layer on one side, and then coating a thin layer of a coating with a low thermal conductivity and/or a low thermal emissivity on the opposite side.

In one exemplary embodiment, the method of making an insulating wrapping paper product comprises: forming a paper sheet comprising one or more layers, then coating the formed paper layer with a moisture barrier and/or a grease resistant layer on one side, and then coating a thin layer of a coating with a low thermal conductivity and/or a low thermal emissivity on the same side.

The present invention is even further directed to methods of using insulated paper products. In one exemplary embodiment, the method of using an insulated paper product comprises: insulating an object (e.g., food, medicine, pharmaceuticals, ice, flowers, etc.) via any one of the herein-described insulated paper products.

These and other features and advantages of the present invention will become apparent after a review of the following detailed description of the disclosed embodiments and the appended claims.

BRIEF DESCRIPTION OF THE FIGURES

The present invention is further described with reference to the appended figure, wherein:

FIGS. 10-13A depict additional exemplary storage containers comprising any one of the exemplary insulated paper products of the present invention;

FIG. 19B depicts a cross sectional view of the test apparatus;

DETAILED DESCRIPTION OF THE INVENTION

Figure 1:
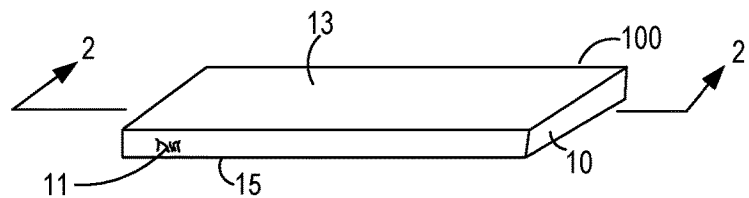
FIG. 1 depicts a perspective view of an exemplary paper product of the present invention.
Figure 2A:
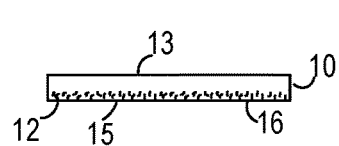
FIGS. 2A-2C depict exemplary cross-sectional views of the exemplary paper product shown in FIG. 1 as viewed along line 2-2 shown in FIG. 1.
Figure 2B:
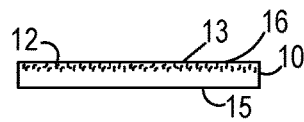
Figure 2C:
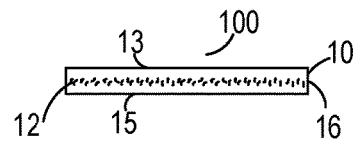
Figure 3:
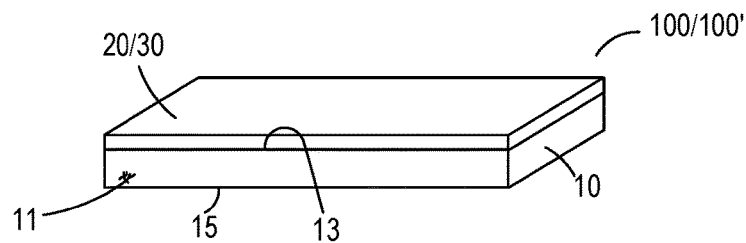
FIG. 3 depicts a perspective view of another exemplary paper product of the present invention.
Figure 4A:
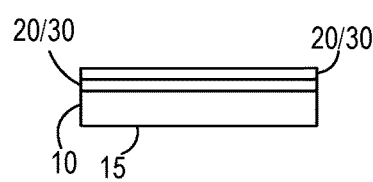
FIGS. 4A-4C depict side views of exemplary paper products of the present invention.
Figure 4B:
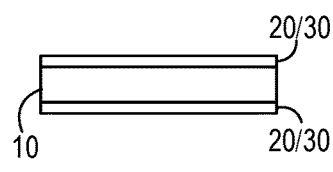
Figure 4C:
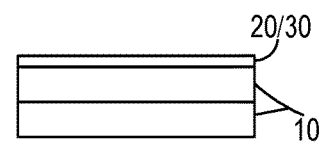
Figure 5:
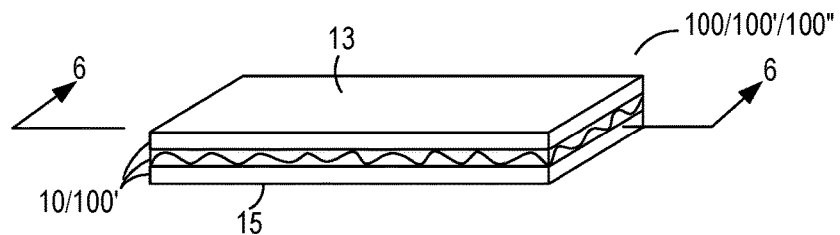
FIG. 5 depicts a perspective view of another exemplary paper product of the present invention (also referred to herein as "an integral paper product")

The present invention is directed to insulated paper products comprising fibers 11 (e.g., wood pulp fibers 11) and insulating material 12. Although shown in all figures, each paper layer 10 comprises fibers 11 (e.g., wood pulp fibers 11) with or without other paper layer additives including, but not limited to, an insulating material 12. Some definitions of fibers, paper, and packaging, as well as product specification and fiber sources, are provided below.

As used herein, the term "paper" is used to identify a type of non-woven material in which fibers are randomly oriented in all directions. Fibers principally made from cellulose are poured as a slurry on a mesh screen. As the paper is formed, the fibers come into contact with each other, and physically bond with neighboring fibers via a variety of interactions, including hydrogen bonding. The fibers originally come from plants including trees, although synthetic and mineral fibers, or other types of fibers, may optionally be included. Often, the paper also contains recycled fiber. Wood may be sourced from direct harvesting of trees from forest land, or from lumber industry byproducts (such as sawdust).

Paper fibers may include the fibrous portions from many parts, including softwoods (such as those plants with needles instead of leaves, for example, loblolly pine) and hardwoods. Other plants that yield useful paper fibers include but are not limited to bamboo, sugar cane, wheat straw, reed grass, mischanthus grass, coconut fiber, hemp fiber, cotton fiber, jute, palm, reeds, and papyrus. Cellulose fibers in many plants are bound together with lignin.

In the case of virgin (non-recycled) fiber, much of the lignin is removed during the pulping process. Recycled paper may include fibers from corrugated, fiber board, writing paper, pressboard, card, newspaper, tissue paper, specialty papers, linerboard, containerboard, boxboard, PE-lined paperboard, carton material, cup stock, or foodboard.

When made from trees, the pulping process involves methods to separate the individual cellulosic fibers into a slurry, as well as remove some or all of the lignin. Pulping methods may include a) thermomechanical pulping, which involves the use of steam and sheer forces generated between a spinning and a stationary plate, b) chemical pulping, which uses strong chemicals to break down the pulp by dissolving the lignin, and/or c) the semi-chem process, which uses a combination of mechanical and chemical methods. Most often, fluted medium board (e.g., fluted medium board 23) is made using semi-chem process pulp and/or recycled paper fiber. Other types of pulp include solid bleached sulfate pulp, chipboard, and kraft.

Paper (and paper layer 10), as used herein, may broadly include any material that includes 15% or more cellulose fibers (discussed further below). Other additives, including insulating material 12, other particles/additives/components that impart grease resistant and/or water resistant, as well as other particles/additives/components to impart strength. Non-paper (and non-paper layer 30) is anything containing less than 15% of cellulose fibers (discussed further below).

As used herein, the term insulating material, such as insulating material 12, is used to described inorganic or organic materials that provide some degree of insulation. The term insulating material, as in insulating material 12, does not include air alone or any other gas alone, although air and/or another gas could be trapped within one or more inorganic or organic insulating material 12.

Paper products 10/100'/60, comprising fibers 11 (e.g., wood pulp fibers 11) and insulating material 12, can either be made flat (e.g., insulated paper products 100/100') using a screen to make flat materials, or alternatively be molded, vacuum formed, or thermoformed from a pulp suspension to form essentially three-dimensional (non-flat) objects (e.g., molded or otherwise formed containers 60 shown in FIGS.

9A-13B). Such three-dimensional paper products include certain packaging, for instance, egg crates and egg cartons, packaging that protects the corners of products shipped in the mail, biodegradable compost containers, biodegradable plant pots, disposable urinals and bed pans used in hospitals, disposable cat little boxes, and the like. Additives, including insulating material 12, may be included within and/or on the paper products 10/100'/60 to impart thermal insulation properties, strength under moist or wet conditions, impart water repellency or water proofing, impart grease absorption resistance, increase strength, improve the color, improve printability, or other aesthetic aspects.

Additives, including insulating material 12, may be added to the paper pulp prior to casting on the paper wire or otherwise molding the pulp with additives into a product 10/100'/60. Alternatively, additives, including insulating material 12, may be added at the size press, or after the steam can dryers. Additives, including insulating material 12, can also be added to a clay coating (e.g., coating 30) often applied to liner board (e.g., liner board 21/22) to make clay coated kraftback, or clay coated newsback.

Paper packaging (e.g., containers 60 shown in FIGS. 9A-13B), formed from the insulated paper products 100/100'/100" of the present invention, may include a wide variety of formats, including: regular slotted container (RSC), overlap slotted container, full overlap slotted container, special center slotted container, Bag-in-Box, center special overlap slotted container, center special full-overlap slotted container, snap- or 1-2-3-bottom box with tuck top, snap- or 1-2-3-bottom box with RSC top, Full Bottom File Box, Hamper Style, Ft. Wayne Bottom or Anderson Lock Bottom, Bellows Style top and Bottom Container, Integral Divider Container, RSC with Internal Divider or Self Divider Box, Full-telescope Design-style Box, Full-telescope Half-slotted Box, Partial-Telescope Design-style Box, Partial-telescope half-slotted box, Design-Style Box with cover, Half-slotted Box with cover, Octagonal Double Cover Container, Double cover box, Interlocking Double-Cover box, double-thickness score-line box, one-piece folder, two-piece folder, three-piece folder, fiver panel folder, one piece folder with air cell/end buffers (used to protect e.g. books), wrap-around blank, tuck folder, one piece telescope, double-slide box, number 2 or 3 bliss box, recessed end box, self-erecting box, pre-glued auto bottom with RSC top flaps, four corner tray, self-erecting six-corner tray, flange box, Arthur lock bottom, valentine lock container, reverse valentine lock container.

Medium board used in the insulated paper products 100/100'/100" of the present invention may be fluted with flutes of different dimensions. See, for example, exemplary fluted medium board 23 shown in FIGS. 6A-6D). The Fiber Box Handbook defines flutes and flute dimensions as: A, B, C, E, F, G, K, N, as well as R/S/T/D. The liner and medium papers may also be tested and rated by different burst grade: 125-350 SW, 23-55 ECT, 200-600 DW, 42-82 ECT DW, 700-1300 TW, 67-112 ECT TW. The carton or box (e.g., box 61) may then be folded into the following industry known styles: reverse tuck, snap lock, automatic bottom, straight tuck, tuck top snaplock bottom, tuck top automatic bottom, seal end, beers, mailing envelopes, folder, and simplex.

As discussed herein, the insulated paper products of the present invention may comprise a single paper layer with insulating material dispersed therein or coated thereon, or may comprise two or more paper layers in combination with insulating material, wherein the insulating material is within one or more of the paper layers of the insulated paper product and/or is present as a component within the insulated paper product (e.g., as a separate layer from the paper layers and/or as a filler within a layer or component of the insulated paper product). See, for example, exemplary insulated paper products 100/100'/100" in FIGS. 1-6D.

The insulated paper products of the present invention may further comprise one or additional layers other than the one or more paper layers and possible layers of insulating material. Suitable additional layers may include, but are not limited to, a coating that provides reduced emissivity of the insulated paper product, a coating that provides a desired color and/or surface texture for the insulated paper product, and a coating that provide enhanced water-repellency (e.g., waterproofing properties) to the insulated paper product. See, for example, exemplary insulated paper products 100/100'/100" in FIGS. 6A-6D.

Figure 6A:
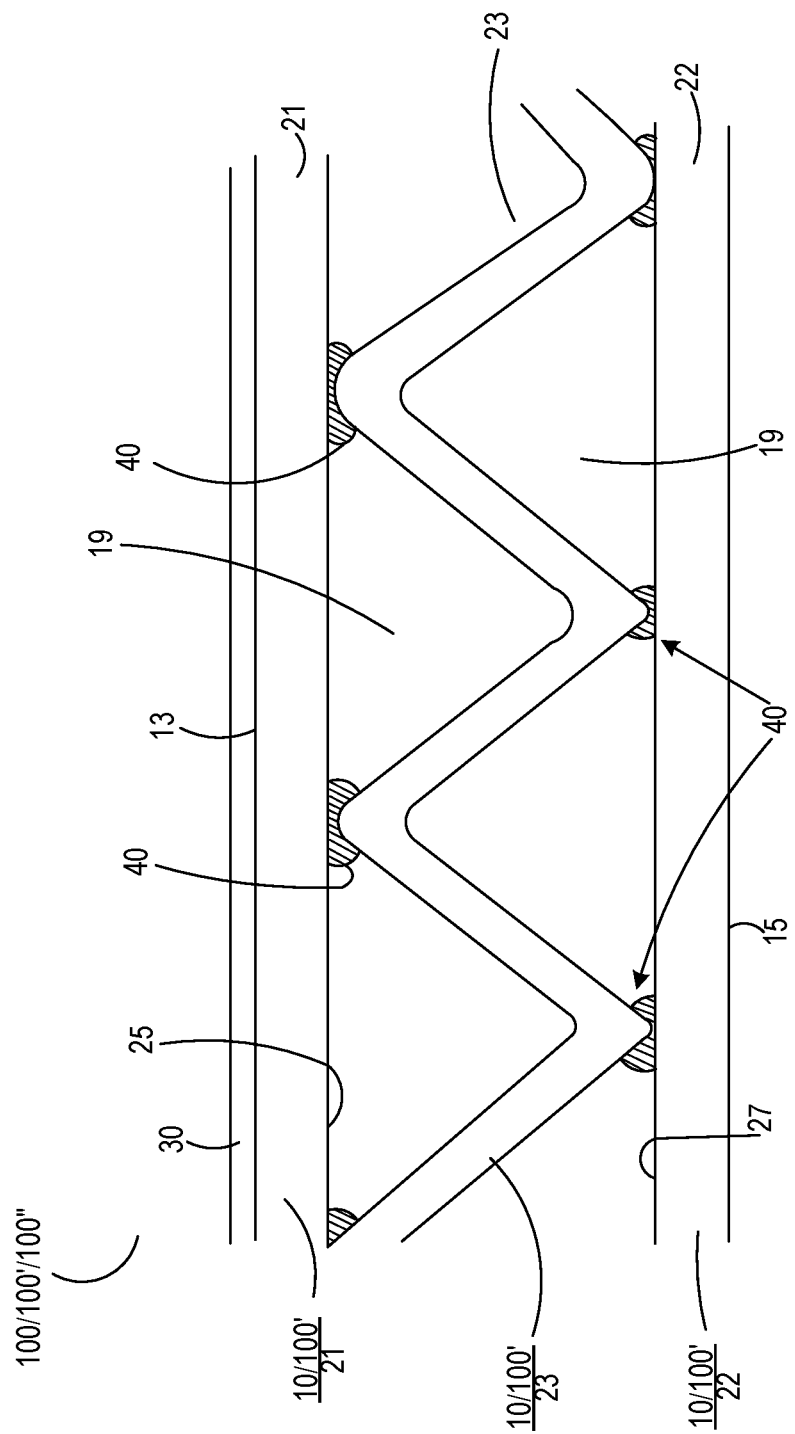
FIGS. 6A-6D depict exemplary cross-sectional views of the exemplary paper product shown in FIG. 5 as viewed along line 6-6 shown in FIG. 5.

In exemplary insulated paper product 100/100'/100" shown in FIG. 6A, a corrugated cardboard structure 100/100'/100" comprises two liner boards 21/22 bonded to a fluted medium board 23. One (or both) of the liner boards 21/22 may be coated (e.g., clay coated) with coating layer 30 for aesthetics. The fluted medium 23 may have a range of flute dimensions, which are classified by the industry as A-flute through F-Flute. Each liner board 21/22 may be made from one ply of paper 10/100', or it may comprise two or more plies 10/100'. Other types of board that could be used in combination with the above-described insulated paper products 100/100'/100" discussed above: pressboard—pressed fiber board; honeycomb board—e.g., two liner boards 21/22 with a honeycomb spacer in between.

Figure 6B:
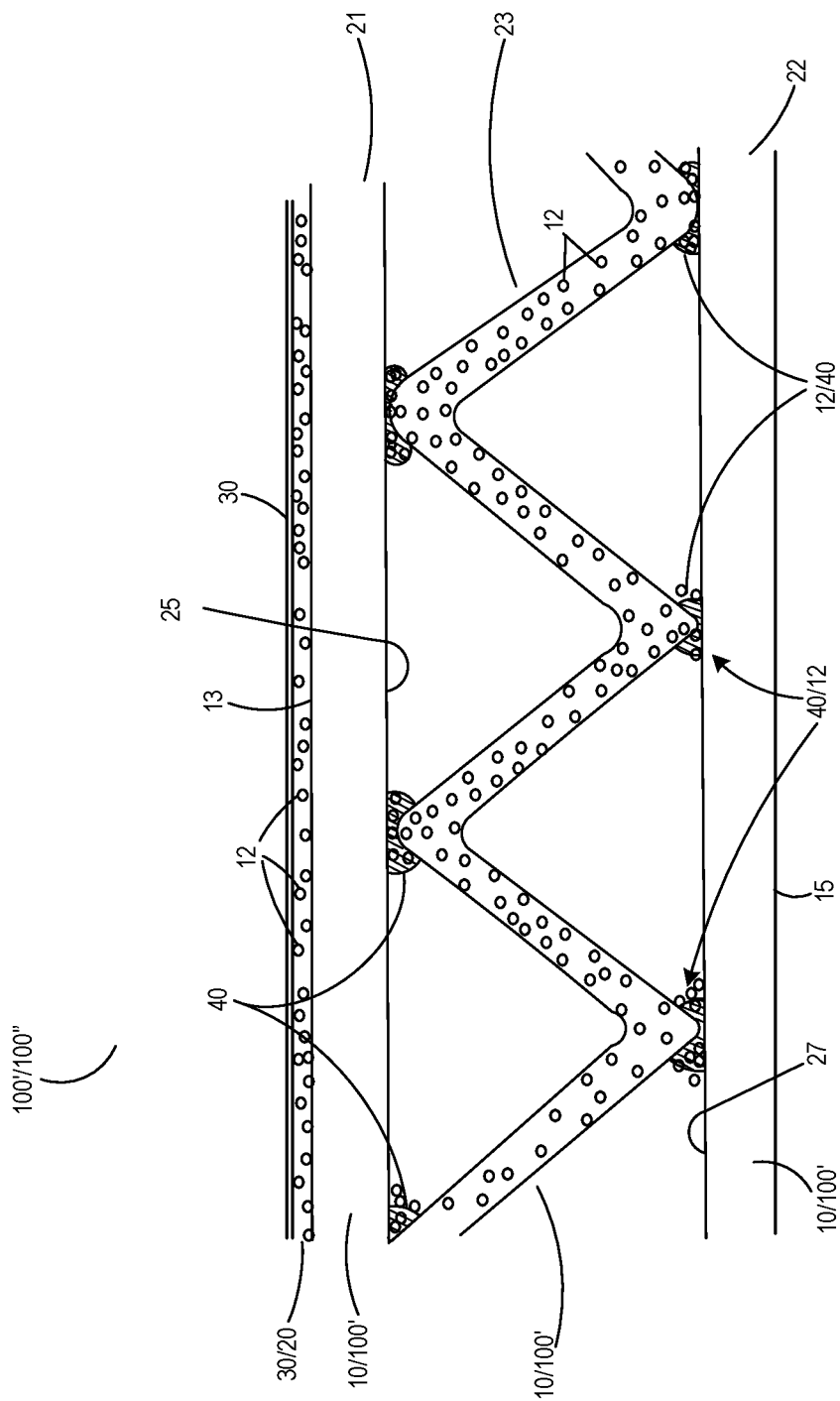

In exemplary insulated paper product 100/100'/100" shown in FIG. 6B, a corrugated cardboard structure 100/100'/100" comprises two liner boards 21/22 bonded to a fluted medium board 23, and demonstrates several opportunities for incorporation of insulating additives 12 into the structure of corrugated cardboard 100/100'/100". First, insulating additives 12 have been added to the furnish of the fluted medium 23. Second, the flutes have been further isolated from heat transfer via conduction by incorporating insulating additives 12 into the starch adhesive 40 that bonds each flute (e.g., of fluted medium 23) to the liner boards 21/22. Third, the liner board 21 is coated with insulating additives 12 via a coating 30. Fourth, to slow radiative heat transfer, a low emissivity coating 30 is overcoated on the outside of the corrugated cardboard structure 100/100'/100" (e.g., a box 61). Such a coating 30 will reflect vs. absorb radiative heat and infra-red radiation.

Figure 6C:
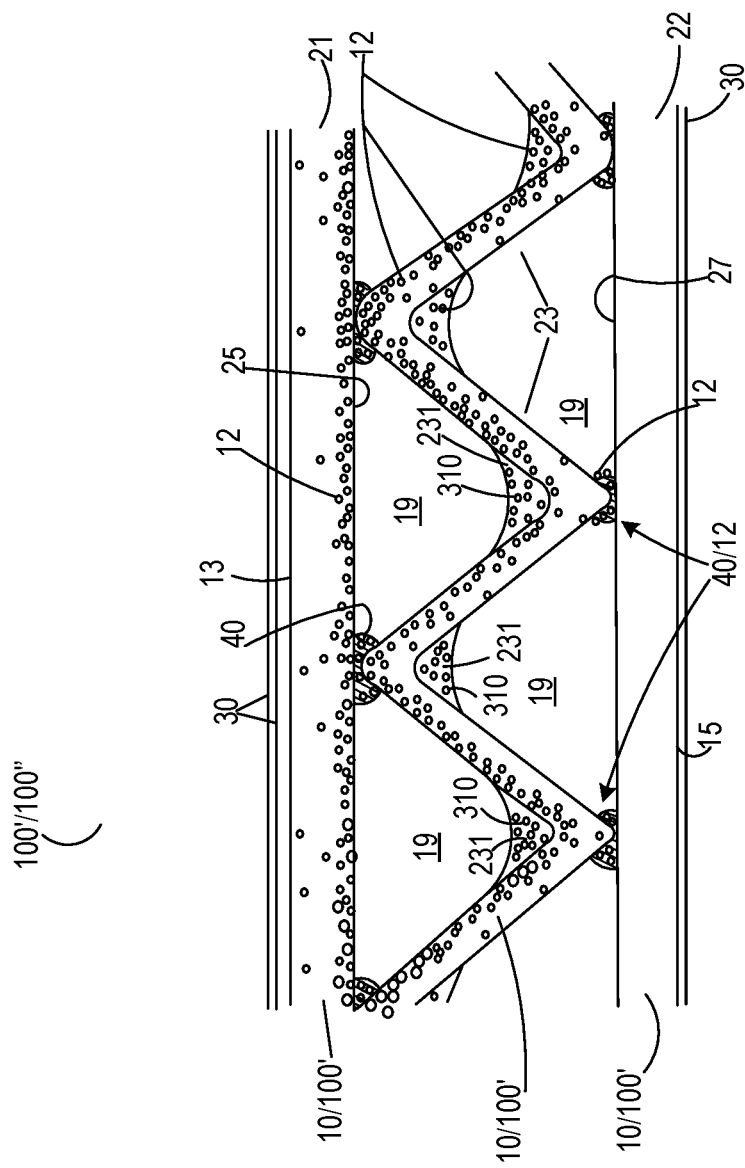

In exemplary insulated paper product 100/100'/100" shown in FIG. 6C, another corrugated cardboard structure 100/100'/100" comprises two liner boards 21/22 bonded to a fluted medium board 23, and again demonstrates several opportunities for incorporation of insulating additives 12 into the corrugated cardboard structure 100/100'/100". First, insulating additives 12 have been added to the furnish of the fluted medium board 23, however, in such a way that the insulating material 12 has preferentially segregated to one face (e.g., the upper face as shown) of the medium fluted board 23 over the other (e.g., the lower face as shown). Second, the flutes (of the medium fluted board 23) have been further isolated from heat transfer via conduction by incorporating insulating additives 12 into the starch adhesive 40 that bonds each flute of the medium fluted board 23 to the liner boards 21/22. Third, another coating 310 containing insulating additives 12 has been incorporated in the valleys 231 of the flutes. Fourth, one of the liner boards 21/22 contains insulating additives 12 distributed in a non-uniform manner (e.g., such as in first liner board 21 as shown). Fifth, to slow radiative heat transfer, a low emissivity coating 30 is overcoated on the outside faces of both liner boards 21/22. Such a coating 30 will reflect vs. absorb radiative heat and infra-red radiation. Emissivity relates to both a surface's ability to absorb and radiate heat. Thus, a low emissivity coating will also show reduced heat loss through radiative cooling.

Figure 6D:
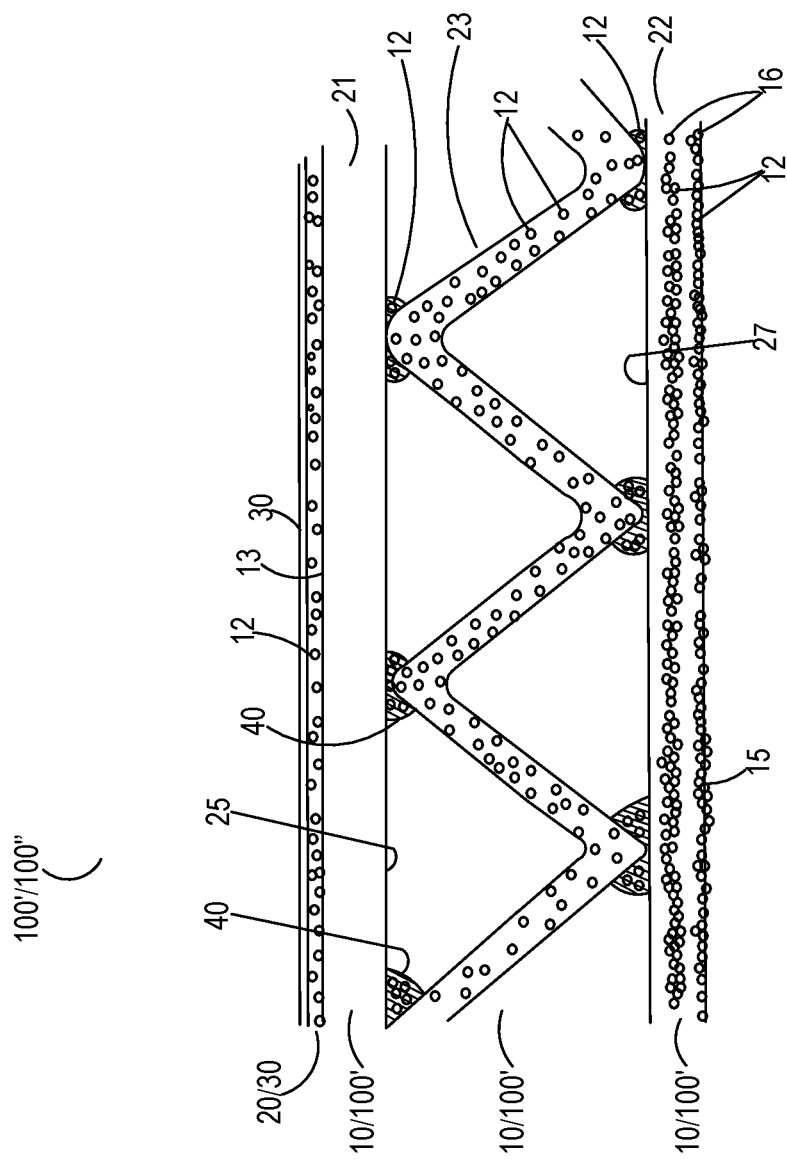

In exemplary insulated paper product 100/100'/100" shown in FIG. 6D, another corrugated cardboard structure 100/100'/100" comprises two liner boards 21/22 bonded to a fluted medium board 23, and again demonstrates several opportunities for incorporation of insulating additives 12 into the insulated paper product 100/100'/100". First, insulating additives 12 have been added to the furnish of the fluted medium board 23 in such a way that the insulating materials 12 are distributed evenly throughout the thickness of the one or more paper layers 10/100'. Second, the flutes of the fluted medium board 23 have been further isolated from heat transfer via conduction by incorporating insulating additives 12 into the starch adhesive 40 that bonds each flute of the fluted medium board 23 to the liner boards 21/22. Third, another coating 30 containing insulating additives 12 has been coated onto one of the liner board 21. Fourth, the second liner board 22 contains insulating additives 12 distributed in a non-uniform manner. Fifth, to slow radiative heat transfer, a low emissivity coating 30 is overcoated on the outside faces of one of the liner boards 21. Such a coating 30 will reflect vs. absorb radiative heat and infra-red radiation. It will also show reduced heat loss through radiative cooling because emissivity relates to both a surfaces ability to absorb and radiate heat.

In addition, any of the insulated paper products of the present invention described herein may be configured into a variety of shapes. For example, in some embodiments, the insulated paper product is in the form of an insulated cup or mug that may be used to house a hot beverage such as coffee. Such insulated paper products may be used instead of STYROFOAM® cups, eliminating the disposal and environmental problems associated with STYROFOAM® cups. In other embodiments, the insulated paper product is in the form of insulated packaging for temporary storage and transport of items such as food, medicines, etc. Such insulated paper products may be in the form of an insulated box, corrugated or not corrugated, as well as many other packaging items discussed herein. See, for example, exemplary insulated paper products 100/100'/100" in FIGS. 9A-13B.

Regardless of configuration and/or shape, the insulated paper products 100/100'/100" of the present invention provide a degree of insulation due to coating compositions that reduce heat transfer.

The present invention is further directed to methods of making and using the herein disclosed and described coated insulated paper products. The insulated paper products may be made using papermaking equipment and techniques so as to produce one or more paper layers. As discussed herein, the methods of making the insulated paper products of the present invention involve the strategic placement of one or more insulating materials within a given insulated paper product and/or the strategic placement of one or more optional coatings on the insulated paper product so as to provide superior insulating properties, as well as other properties to the insulated paper product. Exemplary method steps and procedures for forming insulated paper products of the present invention are shown/described in FIGS. 7A-7C and FIG. 8.

Figure 7A:
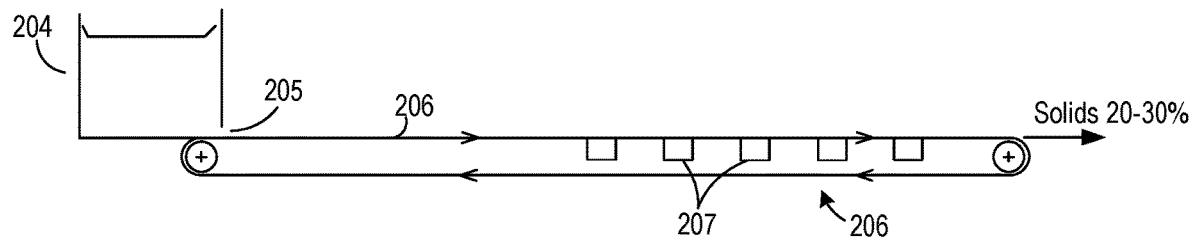
FIGS. 7A-7C depict an exemplary process flow in an exemplary papermaking process suitable for use in forming the exemplary paper products of the present invention.
Figure 7B:
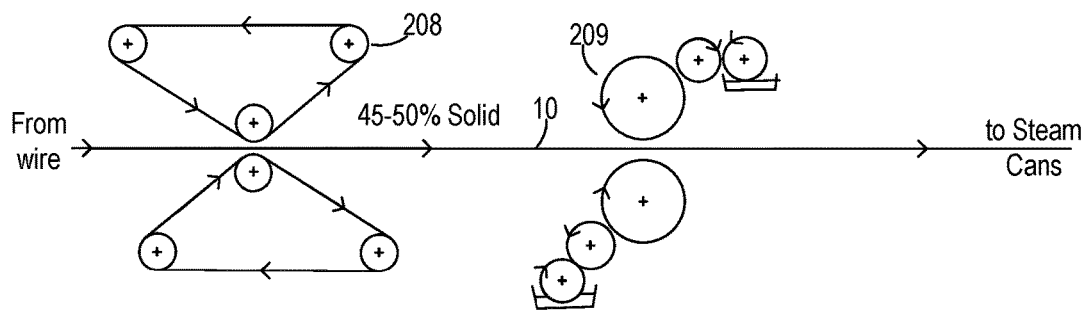
Figure 7C:
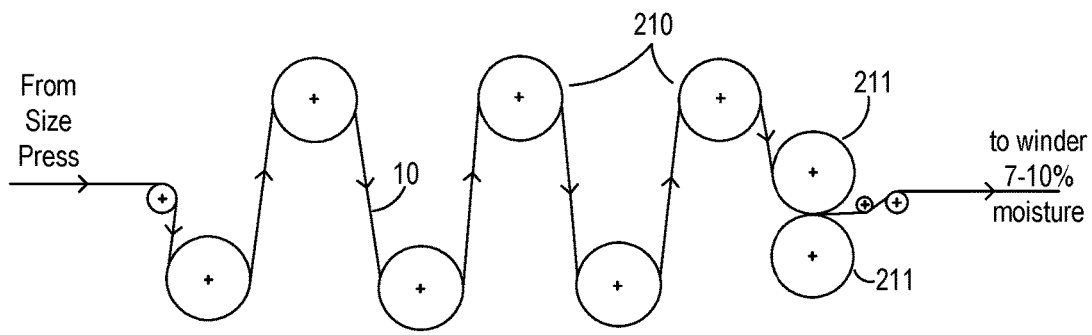

FIGS. 7A-7C depict an exemplary process of forming paper sheets 10. As shown in FIG. 7A, pulp (furnish) is pumped into a header box 204. The fiber content of the furnish is approximately 1-2 wt % at this stage. A gate 205 allows furnish to flow out onto the moving forming wire (a fine mesh conveyor.) 206. The forming wire 206 may be 75-100 feet long. Initially, water drains via gravity, however, further down, vacuum boxes 207 beneath the wire 206 assist water removal, increasing the fiber content to around 20-30 wt %.

As shown in FIG. 7B, the material (~20-30 wt % fiber) is then fed through one or more felt presses 208, which "blot" the precursor paper (i.e., precursor to paper layer 10), removing more water, and increasing the fiber content to around 45-50 wt %. If starch or another additive or coating is to be applied, then that may be done at the size press 209 prior to drying. Many different materials may be added at the size press 209 prior to the dryers, including starch, sizes, waxes, coatings to impart wet strength, materials to impart water resistance, and materials that impart grease proofing.

As shown in FIG. 7C, drying may be affected in a number of ways, including running over steam cans 210, or entering a long hot air-drying tunnel (not shown). After passing through calendar rolls 211 and prior to winding, the paper 10 may be between 6 to 10% moisture content.

Figure 8:
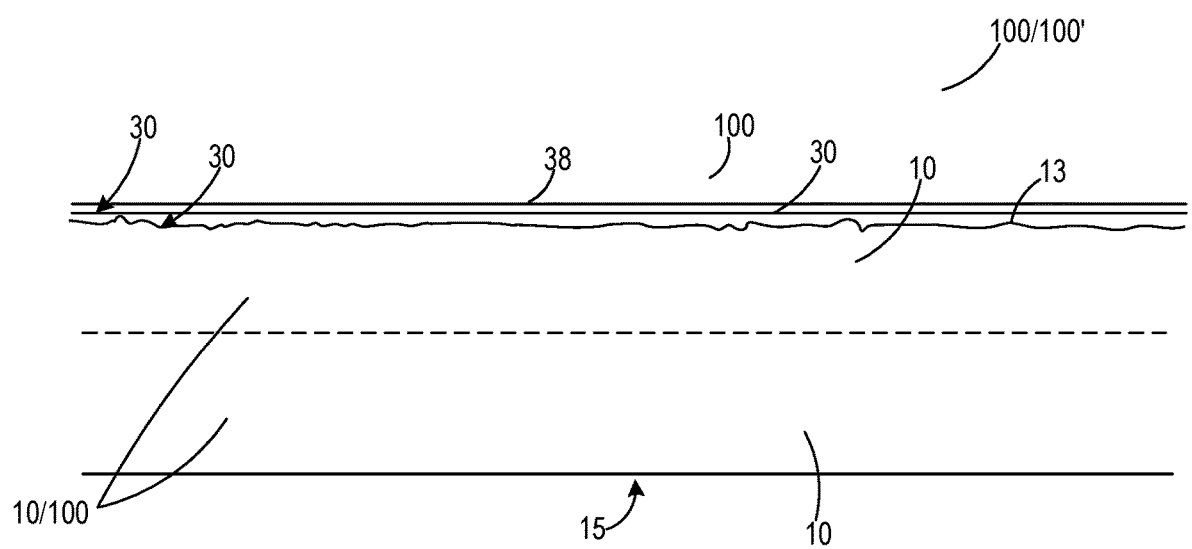
FIG. 8 depicts a side view of another paper product forming process step suitable for forming an exemplary paper product of the present invention.

FIG. 8 depicts details of an exemplary linerboard 100 suitable for use in forming an insulated paper product 100/100'/100" of the present invention or a component (e.g., a layer or outer linerboard) of an insulated paper product 100/100'/100" of the present invention. As shown in FIG. 8, exemplary linerboard 100 comprises two sheets of paper 10 laminated to one another. Exemplary linerboard 100 further comprises a first clay coating 30 directly on an outer surface 13 of one of the paper layers 10, and an outermost second white clay coating 30 so as to provide a printable surface/layer 38 for exemplary linerboard 100. First clay coating 30 evens out the valleys and troughs of the rough paper 10, leaving a smooth surface for additional coatings and for high-quality printing.

The methods of using the insulated paper products 10/100/100'/100" of the present invention may comprise insulating food, medicines, etc. from hot or cold environments. In some embodiments, the method may simply comprise placing an item (e.g., food, medicines, etc.) within an insulated paper product 10/100/100'/100" of the present invention (e.g., putting hot coffee in a cup of the present invention). In other embodiments, the method may comprise placing an item (e.g., food, medicines, etc.) within an insulated paper product 10/100/100'/100" of the present invention (e.g., a bag or a box), and sealing the insulated paper product 10/100/100'/100" for transport.

As discussed herein, methods of using the insulated paper products 10/100/100'/100" of the present invention may involve insulating an item (e.g., food, medicines, etc.) from hot or cold environments, wherein the item (e.g., food, medicines, etc.) is placed or packaged within an insulated paper product 10/100/100'/100" that has a conventional shape, such as a cup or box. In other words, the insulated paper products 10/100/100'/100" of the present invention take the place or conventional items such as cups and boxes so as to provide one or more advantages as discussed above. As discussed herein, the insulated paper products 10/100/100'/100" of the present invention may have a variety of shapes and configurations similar to many conventional items such as cups and boxes.

During use, the insulated paper products 10/100/100'/100"/60 of the present invention desirably provide/have one or more of the following features/properties in addition to providing insulating properties:

(1) Moisture and Grease Resistance:

Desirably, the insulated paper products 10/100/100'/100"/60 of the present invention (e.g., a box 61) can be placed into a freezer and then taken out and stacked at room temperature. Such a process usually leads to the insulated paper product 10/100/100'/100"/60 (e.g., a box 61) "sweating" through condensation in the warm air condensing on the surface of the insulated paper product 10/100/100'/100"/60 (e.g., a box 61). In this regard, it is advantageous for the insulated paper product 10/100/100'/100"/60 (e.g., a box 61) to be resistant to moisture ingress. Multiple different additives can be used to reduce the propensity of the insulated paper product 10/100/100'/100"/60 (e.g., a box 61) to absorb moisture and weaken when moist. For example, perlite 12 is more hydrophobic than paper fibers 11, so the incorporation of perlite 12 into and/or onto a paper layer 10 renders the paper layer 10 less absorbent. Further, the adhesive 40 that bonds flutes to liner board (see, FIGS. 6A-6D) can be made moisture resistant by adding a moisture resistant adhesive resin, such as Coragum SR available from Ingredion, Westchester Ill. In addition, a hydrophobic treatment can be applied to the exterior of the insulated paper product 10/100/100'/100"/60 (e.g., a box 61). Moreover, a chemical cross-linking agent or reactive resin (e.g. a methylol melanine) may be applied to the insulated paper product 10/100/100'/100"/60 (e.g., a box 61), so that it is less sensitive to moisture. Lastly, paper fiber 11 may be treated with rosin, and then aluminum sulfate can be added to the furnish to impart hydrophobicity to the paper layer 10. Alternatively, a wax may be added to paper layer 10 to impart hydrophobicity. Commercial examples of water-resistant coatings that may be applied onto paper layer 10 include, Epotal 5440 (BASF) (i.e., a styrene acrylic based copolymer emulsion), Rhoplex P-376 (Dow) (i.e., a styrene acrylic copolymer emulsion binder), Diofan B204 (Solvay) (i.e., a poly(vinylidene chloride) (PVDC) latex), Barrier-Grip 9471A (IGI) (i.e., a blend including a styrene acrylic copolymer emulsion, a poly(ethylene) wax and clay), Daran SL143 (Owensboro) (i.e., a poly(vinylidene chloride) (PVDC) latex). Of particular interest are moisture barriers that are repulpable, including Barrier-Grip 9471A, Aquaban, EC404 (a repulpable moisture barrier) from International Group Inc., (Toronto Canada.) or EcoShield Barrier Coating from Cortec Packaging. These proprietary commercial materials may include moisture and gas barrier additives and treatments such as low-molecular weight resins, waxes including paraffin wax and natural waxes such as beeswax, linear fatty acid esters of fatty alcohols, branched esters for example esters of 15-hydroxypalmitic acid, fatty alcohol ethers, hydrocarbons in the range of about $C_{15}$ to $C_{50}$, hydrocarbon resins, particularly petroleum resins, styrene resins, cyclopentadiene resins, and terpene resins. Such additives can be used in effective amounts, which vary depending upon the properties required.

While undesirable from an environmental and recycling perspective, a thin layer of low density polyethylene (PE) may also be coated onto paper layer 10, fiberboard 21/22/23, and card stock to impart oil and water resistance, as is common practice in the fast food and hot & cold beverage retail industry. Alternatively, the surface of the paper may be cross linked by applying reactive groups that react with hydroxyl groups present in cellulose. For examples, melamine formaldehyde resins, urea formaldehyde resins, methylol melamine, epichlorohydrin, trichlorotriazine, dichlorotriazine, chlorotriazine coupled with diazabicylco-[2,2,2]-octane which acts as a catalyst, compounds that can undergo Michael 1,4 addition in the presence of base, and a wide range of other bifunctional reactive compounds. In recent years, the paper industry has experienced increased pressure to seek alternatives to PE liners and linings for packaging, leading the chemical industry to innovate new coatings that impart grease and water resistance while being repulpable. US 2019/0077537 to Georgia Pacific Bleached Board LLC teaches the use of several different coatings to impart resistance to water and lipid fluids to paper without the use of PE film, including Epotal 5440 (BASF), Rhoplex P-376 (Dow), Diofan B204 (Solvay), Barrier-Grip 9471A (IGI), and Daran SL143 (Owensboro). These coatings were combined to impart heat seal-ability as well as water proofing to paper beverage cups.

(2) Transient Aluminized Layer for Low Emissivity:

Addition of a thin aluminized coating 30 onto the paper (e.g., paper layer 10 and/or insulated paper product 100/100' and/or corrugated paper product 100" and/or storage container 60) and/or onto the perlite 12 to lower emissivity. Aluminum has a very low emissivity and may be applied to various materials through a process called sputtering, or by vapor deposition. In this process, aluminum atoms traverse a vacuum and condense onto the surface of another material (e.g., paper layer 10). Many thermal blankets are made via a process like this. Perlite particles 12, as well as other types of particles, may be coated partially or totally in aluminum via these types of process. Paper or paper fibers 11 may also be metallized by an aluminum coating by similar processes. Aluminum foil and metalized plastic films do not re-pulp and have to be removed from the OCC and later waste streams, so these materials are not preferred in some embodiments of the present invention.

However, it is possible to incorporate a chelating agent in another layer of the packaging (e.g., box 61), or for instance in the adhesive, or in one of the coatings. Such a chelating agent would function to remove the aluminum during a pulping process. Chelating agents may include oxalic acid and oxalate salts, EDTA (ethylene diamine tetraacetic acid) and its various salts, salicylate, sodium hexametaphosphate and other materials. In this way, the aluminum could be removed. Soluble aluminum salts are already used in papermaking for instance as a flocculant for fines, as well as in combination with rosin soap to impart water resistance.

(3) Repulpable/Recyclable/Biodestructable:

A repulpable/recyclable/biodestructable thermally insulating coating, comprising one or more inorganic pigments, which have been found to reduce the transfer of radiant heat energy when coated onto paper. The inventors found that a coating that included certain pigments such as mica, bismuth oxychloride, bismuth oxychloride coated mica, sericite, zinc oxide, zinc sulfide, cadmium sulfide will reduce the rate of radiative heat transfer through the coated paper.

(4) Odor Control and Taint of Foodstuffs:

A concern with packaging and shipping of foodstuffs is taint and odor. This may arise from the inherent smell of virgin or recycled card, or it could arise when one package containing a strongly odorous material is placed in contact or adjacent to a package containing a food, beverage, drug, or tobacco product. There may be several ways to mitigate odor and taint of foodstuffs by incorporating materials into the paper structure. For instance, transition metal ion modified silica nanoparticles such as those described in U.S. Pat. No. 7,976,855 are able to efficiently capture malodorous chemicals such as mercaptans, carboxylic acids, amine and other odors. U.S. Pat. No. 8,168,563 teaches that silica nanoparticles may be modified by reaction with terminal aminoalkylthrimethoxysilanes and then with copper II ions to further enhance the odor capturing capabilities. Molecular sieves may also be included to sequester low molecular weight odor forming molecules such as hydrogen sulfide and zeolites to sequester ammonia and amine odors. Activated carbon was also found to impart thermal insulation, and would also be anticipated to absorb multiple odors. Activated carbon tends to be acidic in nature, and so may be especially good at taking up basic and weakly basic odors such as ammonia and amine odors. More complex odors also have an affinity for activated carbon, including mercaptan, thiol, and aromatic odors. Cyclodextrins, such as β-cyclodextrin or γ-cyclodextrin and their derivatives may also be incorporated for their odor absorbing properties. One or more of these materials/features could be incorporated into any of the here-in described paper layer 10 and/or insulated paper product 100/100' and/or corrugated paper product 100" and/or storage container 60 to modify and/or minimize any odors present.

Odor transmission from one package to another, or from one good to another may also be mitigated through the use of barrier materials. As one object of the present invention is repulpability of packaging, aluminum foil, PE or PET film, and other synthetic materials would not be consistent with some embodiments of the present invention. However, some materials that provide thermal insulation have a microscopic flake morphology, such as mica and coated mica, and these materials may be useful for effectively blocking the transport of low and high MW malodor causing materials from ingress into packages (e.g., comprising or formed from insulated paper product 10/100/100'/100") of the present invention.

(5) Fiber Blend, Recycling, and Strength:

Short length fibers tend to come from refined hardwood, while longer fibers come from softwood. A good ratio of 75% softwood 25% hardwood balances the properties of the two types of fiber, optimizing tensile strength. Recently, hemp fibers have come under increasing attention as a paper additive. Hemp fibers are far longer than other pulp fibers, help increase strength due to increasing contact points and bonding, and so may be subjected to multiple recycling steps—far more than regular wood fibers. Hemp fibers, being much longer than softwood may be recycled around 40 times vs. 6 for other types of fiber. One or more of these materials/features could be incorporated into any of the here-in described insulated paper layer 10 and/or insulated paper product 100/100' and/or corrugated paper product 100" and/or storage container 60.

In order to increase the ability of wood fibers to bond more through surface interactions, additional processes may be used to further fibrillate the fibers. For instance, the fibers may be subjected to an extreme high-shear environment, such as a colloid mill. The high sheer environment of two plate spinning in contact fibrillates cellulose fiber aggregates, increasing bonding, as well as the propensity to retain filler solids. Other ways to fibrillate the fiber can include prolonged beating in a mechanical Hollander pulp beater such as disclosed in the U.S. Pat. No. 1,883,051 or by high-sheer mixing, high-speed mixing, or media milling. Fibrillated cellulose may increase porosity of the paper and paper strength due to enhanced bonding area between fibers. Other ways to increase strength is by including nanocellulose into the paper formulation. One or more of these materials/features could be incorporated into any of the here-in described paper layer 10 and/or insulated paper product 100/100' and/or corrugated paper product 100" and/or storage container 60.

(6) Water Resistance Repulpability:

Rosin is often used as part of a two-part system to impart moisture resistance in paper (e.g., paper layer 10 and/or insulated paper product 100/100' and/or corrugated paper product 100" and/or storage container 60). The second part is post addition of aluminum salt solutions—e.g. aluminum chloride or aluminum sulfate. The aluminum reacts with the rosin soap to make a hydrophobic coating, which may impact repulpability yield. However, including a chelating agent somewhere in another component of the paper product may remove the aluminum from the rosin, thereby increasing the repulpability yield. Other areas of the paper that could carry the chelating agent may include the starch adhesive, and internal layer—for instance, the fluted medium, or an inner layer of the composite. Vapor-Guard R5341B or Barrier Grip 9471A (The International Group Inc., Titusville Pa.) are also useful as barrier coatings that provide the paper with a degree of grease and water resistance, and are described along with other suitable materials in Georgia Pacific Patent Application Publication No. US2019/0077537.

(7) Binders:

Binders are used in coatings to reduce pigment rub-off, ensure adhesion of the coating, and generally seal the coating or ink. Binders for water-based coatings may be solutions such as poly(vinyl alcohol) or ammonia neutralized poly(acrylic acid). Binders that are latex based are more common, as they have a lower viscosity and are easier to formulate with and handle. Latex binders in general are a stable emulsion or dispersion of polymer particles or droplets in water. For instance, natural rubber latex sourced from trees comprises non-crosslinked cis-poly(isoprene) in microscopic droplets dispersed in water, with protein acting as a surfactant to stabilize the latex emulsion. Man-made latex binders include polymers synthesized using emulsion polymerization such as poly(vinyl acetate), poly(acrylonitrile), poly(acrylates), poly(methacrylates), poly(butadiene), poly(styrene), poly(acrylic acid), and various copolymers of these and other polymers. As the water evaporates, the dispersed polymer particles come closer together, until the spherical droplets begin to touch. At first, the spheres become distorted in shape as the get closer. If the glass transition temperature ("Tg") of the polymer is low enough, chain intermingling between the touching droplets will begin to join the droplets together, forming a continuous film.

Rovene VSR-50 is an acrylic latex binder with pH in the range of 8-9, and around 45% solids content. The polymer contained in Rovene VSR-50 has a Tg of around 12° C., and so a heat treatment is needed to coalesce the dried polymer particles to form a film.

Rovene 4100 (Mallard Creek Polymers, N.C.) is a carboxylated styrene-butadiene copolymer emulsion with a polymer Tg around −5° C., so no post-dry heating is required to form a film. The product contains around 50% solids, and the emulsion has a pH of around 6. Rovene 6106 is a styrene-acrylic copolymer emulsion with a high Tg (>100° C.), and so a post-heat treatment is required. Rovene 6090 is modified vinylacetate copolymer emulsion with a polymer Tg of 39° C. This binder has release properties, allowing adhesive materials to be peeled from the coating surface.

Tykote 6160 (Mallard Creek Polymers) is an approximately 50% solids pH 8.0-9.0 acrylic polymer emulsion, with a polymer Tg of 7° C. This binder is claimed to have flexibility combined with moisture vapor barrier properties.

The present invention is further described by the following additional embodiments, examples, and claims. It should be understood that any feature and/or component described herein may be present alone or in combination with any other feature and/or component or combination of features and/or components described herein to form the here-in described paper layer 10 and/or insulated paper product 100/100' and/or corrugated paper product 100" and/or storage container 60 of the present invention. It should be further understood that the numbered embodiments provided below describe many embodiments of the present invention, some claimed and some unclaimed. Even though some of the features in the numbered embodiments provided below may not be claimed, the unclaimed feature(s) in the numbered embodiments provided below do form part of the present invention, and may optionally be incorporated into any claimed product.

ADDITIONAL EMBODIMENTS

Insulated Paper Products

1. An insulated paper product 100 comprising: one or more paper layers 10; and an insulating coating 30 on at least one outer surface 13/15 of said one or more paper layers 10, said insulating coating 30 comprising (i) one or more insulating materials 12 comprising bismuth oxychloride, mica, bismuth oxychloride-coated mica, zinc oxide, aluminum-doped zinc oxide, zinc sulfide, cadmium sulfide, bismuth vanadate, gypsum, sericite, powdered silicon, silver-coated glass bubbles, aluminum oxide, hollow polymeric microsphere pigments, or any mixture or combination thereof, and (ii) a binder. As discussed herein, each paper layer 10 may further comprise one or more additives, the one or more additives including, but not limited to, flocculants and retention aids such as high molecular weight poly(acrylamide), poly(ethylene imine), cationic quar gum, and other cationic polymers; additives to provide water resistance (e.g., wax, synthetic latexes and resins); or any combination thereof. In some embodiments, the insulating coating 30 comprises one or more insulating materials 12 comprising bismuth oxychloride, mica, zinc oxide, zinc sulfide, cadmium sulfide, bismuth vanadate, sericite, or any mixture or combination thereof. In some embodiments, the insulating coating 30 comprises one or more insulating materials 12 comprising bismuth oxychloride, mica, zinc oxide, or any mixture or combination thereof.

2. The insulated paper product 100 of embodiment 1, wherein the one or more paper layers 10 comprises a single paper layer 10.

3. The insulated paper product 100 of embodiment 1, wherein the one or more paper layers 10 comprises two or more paper layers 10.

4. The insulated paper product 100 of any one of embodiments 1 to 3, wherein the insulating coating 30 comprises one or more insulating materials 12 comprising bismuth oxychloride, mica, zinc oxide, aluminum-doped zinc oxide, zinc sulfide, cadmium sulfide, bismuth vanadate, sericite, or any mixture or combination thereof.

5. The insulated paper product 100 of any one of embodiments 1 to 4, wherein the insulating coating 30 comprises one or more insulating materials 12 comprising bismuth oxychloride, mica, zinc oxide, aluminum-doped zinc oxide, or any mixture or combination thereof.

6. The insulated paper product 100 of any one of embodiments 1 to 5, wherein the insulating coating 30 comprises from about 50.0 weight percent (wt %) to about 99.9 wt % of the one or more insulating materials 12 and from about 50.0 wt % to about 0.1 wt % of the binder. It should be understood that the insulating coating 30 may comprise (i) any value between about 50.0 wt % and 99.9 wt %, in increments of 0.1 wt %, e.g., 95.7 wt %, or any range of values between about 50.0 wt % and 99.9 wt %, in increments of 0.1 wt %, e.g., from about 90.2 wt % to 98.1 wt %, of the one or more insulating materials 12, and (ii) any value between about 50.0 wt % and 0.1 wt %, in increments of 0.1 wt %, e.g., 2.4 wt %, or any range of values between about 50.0 wt % and 0.1 wt %, in increments of 0.1 wt %, e.g., from about 18.3 wt % to 0.2 wt %, of the binder. Suitable binders include, but are not limited to, one or more of the binders discussed on pages 14-15 above.

7. The insulated paper product 100 of any one of embodiments 1 to 6, wherein the insulating coating 30 comprises from about 90.0 wt % to about 99.9 wt % of the one or more insulating materials 12 and from about 10.0 wt % to about 0.1 wt % of the binder.

8. The insulated paper product 100 of any one of embodiments 1 to 7, wherein the insulating coating 30 comprises from about 93.0 wt % to about 98.0 wt % of the one or more insulating materials 12 and from about 7.0 wt % to about 2.0 wt % of the binder.

9. The insulated paper product 100 of any one of embodiments 1 to 8, wherein the binder comprises a latex binder. Suitable latex binders include, but are not limited to, latex binders comprising a polymer or co-polymer of one or more monomers selected from styrene, butadiene, acrylic acid, acrylate, methacrylate, and vinyl acetate.

10. The insulated paper product 100 of any one of embodiments 1 to 9, wherein each insulating coating 30 independently comprises one or more coating layers 30 with each coating layer 30 comprising said insulating material 12 and said binder.

11. The insulated paper product 100 of any one of embodiments 1 to 10, wherein at least one insulating coating 30 comprises two or more coating layers 30 with each coating layer 30 comprising said insulating material 12 and said binder.

12. The insulated paper product 100 of embodiment 11, wherein said two or more coating layers 30 comprise (i) a first coating applied onto the one or more paper layers 10 and comprising zinc oxide, aluminum-doped zinc oxide, or any mixture or combination thereof, and (ii) a second coating applied onto the first coating and comprising bismuth oxychloride, bismuth oxychloride-coated mica, or any mixture or combination thereof.

13. The insulated paper product 100 of any one of embodiments 1 to 12, further comprising a treatment to impart water or grease resistance to the insulated paper product 100.

14. The insulated paper product 100 of embodiment 13, wherein the treatment comprises adding one or more treatment additives to one or more of the one or more paper layers 10.

15. The insulated paper product 100 of embodiment 13 or 14, wherein the treatment comprises adding one or more treatment additives to the insulating coating 30.

16. The insulated paper product 100 of any one of embodiments 13 to 15, wherein the treatment comprises adding a water or grease resistance layer comprising one or more treatment additives onto the insulated paper product 100.

17. The insulated paper product 100 of embodiment 16, wherein the insulating coating 30 is applied over the water or grease resistance layer.

18. The insulated paper product 100 of embodiment 16 or 17, wherein the water or grease resistance layer is applied onto an outer surface of the insulated paper product 100 opposite the insulating coating 30.

19. The insulated paper product 100 of any one of embodiments 14 to 18, wherein the one or more treatment additives comprise a wax emulsion, a latex binder, Epotal 5440 (BASF) (i.e., a styrene acrylic based copolymer emulsion), Rhoplex P-376 (Dow) (i.e., a styrene acrylic copolymer emulsion binder), Diofan B204 (Solvay) (i.e., a poly(vinylidene chloride) (PVDC) latex), Barrier-Grip 9471A (IGI) (i.e., a blend including a styrene acrylic copolymer emulsion, a poly(ethylene) wax and clay), Daran SL143 (Owensboro) (i.e., a poly(vinylidene chloride) (PVDC) latex), or any combination thereof.

20. The insulated paper product 100 of any one of embodiments 14 to 19, wherein the one or more treatment additives comprise a wax emulsion, a latex binder, Epotal 5440 (BASF) (i.e., a styrene acrylic based copolymer emulsion), Rhoplex P-376 (Dow) (i.e., a styrene acrylic copolymer emulsion binder), Diofan B204 (Solvay) (i.e., a poly(vinylidene chloride) (PVDC) latex), Barrier-Grip 9471A (IGI) (i.e., a blend including a styrene acrylic copolymer emulsion, a poly(ethylene) wax and clay), Daran SL143 (Owensboro) (i.e., a poly(vinylidene chloride) (PVDC) latex), or any combination thereof.

21. The insulated paper product 100 of any one of embodiments 1 to 20, wherein the insulated paper product 100 has an overall basis weight of less than about 200 grams per square meter (gsm). It should be understood that the insulated paper product 100 may have any overall basis weight between about 40.0 gsm and 200.0 gsm, in increments of 0.1 gsm, e.g., 97.6 gsm, or any range of values between about 40.0 gsm and 200.0 gsm, in increments of 0.1 gsm, e.g., from 40.1 gsm to 160.0 gsm.

22. The insulated paper product 100 of any one of embodiments 1 to 21, wherein the insulated paper product 100 has an overall basis weight ranging from about 50.0 gsm to about 100 gsm.

23. The insulated paper product 100 of any one of embodiments 1 to 22, wherein the insulated paper product 100 comprises a void-containing insulated paper product 100".

24. The insulated paper product 100 of embodiment 23, wherein the void-containing insulated paper product 100" comprises voids 19 within at least one paper layer 10, the voids 19 being encapsulated by a material other than paper (e.g., a paper layer 10 containing hollow beads/particles (not shown)).

25. The insulated paper product 100 of embodiment 23 or 24, wherein the void-containing insulated paper product 100" comprises voids 19 within at least one paper layer 10, the voids 19 being encapsulated by paper (e.g., a paper layer 10 containing air pockets 19 therein, possibly formed via a molding process or a process in which a void-forming material is removed from the paper layer 10). See, FIGS. 5-6D.

26. The insulated paper product 100 of any one of embodiments 23 to 25, wherein the void-containing insulated paper product 100" comprises a corrugated paper product 100".

27. The insulated paper product 100 of any one of embodiments 1 to 26, wherein the integral paper product 100' comprises (i) a first linerboard layer 21 comprising one or more first paper layers 10/100/100', (ii) a second linerboard layer 22 comprising one or more second paper layers 10/100/100', and (iii) (a) a fluted paper layer 23 comprising one or more fluted paper layers 10/100/100' or (b) a honeycomb layer (not shown) positioned between the first linerboard layer 21 and the second linerboard layer 22, and (I) each of (i) said first linerboard layer 21, (ii) said second linerboard layer 22, and (iii) (a) said fluted paper layer 23 or (b) said honeycomb layer (not shown) may independently comprise insulating material 12 therein or thereon, and (II) said insulating coating 30 is present on (i) an outer surface of said first linerboard layer 21, (ii) an outer surface of said second linerboard layer 22, or (iii) both (i) and (ii).

28. An insulated paper product 100 comprising a corrugated integral paper product 100", said corrugated integral paper product 100" comprising: a first linerboard layer 21 comprising one or more first paper layers 10/100/100', a second linerboard layer 22 comprising one or more second paper layers 10/100/100', and (a) a fluted paper layer 23 comprising one or more fluted paper layers 10/100/100' or (b) a honeycomb layer (not shown) positioned between the first linerboard layer 21 and the second linerboard layer 22, wherein one or more of (i) said first linerboard layer 21, (ii) said second linerboard layer 22, and (iii) (a) said fluted paper layer 23 or (b) said honeycomb layer (not shown) each independently comprise optional insulating material 12 therein or thereon; and an insulating coating 30 on (i) an outer surface of said first linerboard layer 21, (ii) an outer surface of said second linerboard layer 22, or (iii) both (i) and (ii).

29. The insulated paper product 100 of embodiment 27 or 28, wherein (a) said fluted paper layer 23 or (b) said honeycomb layer (not shown) provides pockets of air 19 between said first linerboard layer 21 and said second linerboard layer 22.

30. The insulated paper product 100 of embodiment 29, wherein said pockets of air 19 represent from about 20 to 80 volume percent of a total volume occupied by (a) said fluted paper layer 23 or (b) said honeycomb layer (not shown)(i.e., a total volume between innermost opposing surfaces 25/27 of said first linerboard layer 21 and said second linerboard layer 22). See, for example, FIG. 6A.

31. The insulated paper product 100 of any one of embodiments 27 to 30, further comprising an adhesive 40 that bonds portions of (a) said fluted paper layer 23 or (b) said honeycomb layer (not shown) to portions of said first linerboard layer 21 and said second linerboard layer 22. Suitable materials for adhesive 40 include, but are not limited to, starch adhesives, synthetic latex adhesives such as poly (vinyl acetate), natural rubber latex, modified starches, hydrocolloids such as hydroxypropylcellulose, carboxymethylcellulose, and other water soluble polymers such as poly(vinyl alcohol). A cross-linking agent may also be added to the adhesive to avoid potential swelling of the adhesive and weakening of the bonds when wet. Flocculants and retention aids may also be included such as high molecular weight poly(acrylamide), poly(ethylene imine), cationic quar gum, and other cationic polymers. As discussed herein, in some embodiments, adhesive 40 is at least partially filled with one or more of the herein disclosed insulating materials 12.

32. The insulated paper product 100 of embodiment 31, wherein said adhesive 40 has insulating material 12 dispersed therein.

33. The insulated paper product 100 of any one of embodiments 27 to 32, wherein each of (i) said first linerboard layer 21, (ii) said second linerboard layer 22, and (iii) (a) said fluted paper layer 23 or (b) said honeycomb layer (not shown) independently comprises the insulated paper product 100 of any one of embodiments 1 to 25.

34. The insulated paper product 100 of any one of embodiments 27 to 32, wherein each of (i) said first linerboard layer 21, (ii) said second linerboard layer 22, and (iii) (a) said fluted paper layer 23 or (b) said honeycomb layer (not shown) is substantially free of insulating material 12.

35. The insulated paper product 100 of any one of embodiments 27 to 34, wherein the integral paper product 100' comprises said fluted paper layer 23.

36. The insulated paper product 100 of any one of embodiments 27 to 34, wherein the integral paper product 100' comprises said honeycomb layer (not shown).

37. The insulated paper product 100 of any one of embodiments 1 to 36, wherein the insulated paper product 100' further comprises one or more additional non-paper layers 20/30. As used herein, the term "non-paper layer" is used to describe a layer that contains less than 5.0 wt % paper pulp or cellulosic fiber, and typically contains 0 wt % to less than 4.0 wt % paper pulp or cellulosic fiber. Conversely, as used herein, the term "paper layer" (such as each paper layer 10) is used to describe a layer that contains 5.0 wt % or more paper pulp or cellulosic fiber, and typically contains greater than 6.0 wt % up to 100 wt % paper pulp or cellulosic fiber (or any value between 6.0 wt % and 100 wt %, in increments of 0.1 wt %, e.g., 50.0 wt %, or any range of values between 6.0 wt % and 100 wt %, in increments of 0.1 wt %, e.g., from 40.1 wt % to 70.2 wt %).

38. The insulated paper product 100 of embodiment 37, wherein the one or more additional non-paper layers 20/30 comprise a gypsum layer, a clay-containing layer, a polymer coating, a pigment-containing layer, a fabric layer (e.g., a nonwoven, woven or knit fabric layer), a fiber-reinforcement layer (e.g., a layer of unidirectional fibers), a second layer of insulating material 12, a metal film layer, a foam layer, or any combination thereof. One or more of the additional non-paper layers 20/30 may be added to the insulated paper product 100 in order to provide a desire property such as lower (or higher) emissivity, lower (or higher) thermal conductivity, enhanced water-repellency, an aesthetically pleasing color and/or texture, or any combination thereof.

39. The insulated paper product 100 of embodiment 37 or 38, wherein the one or more additional non-paper layers 20/30 comprise a gypsum layer (not shown).

40. The insulated paper product 100 of any one of embodiments 37 to 39, wherein the one or more additional non-paper layers 20/30 comprise a clay-containing layer 30, a coating 30 that provides a lower or higher emissivity of the insulated paper product 100, a pigment-containing layer 30, or any combination thereof. See, FIG. 6A.

41. The insulated paper product 100 of any one of embodiments 37 to 40, wherein the one or more non-paper layers 20/30 comprise at least two non-paper layers 20/30.

42. The insulated paper product 100 of any one of embodiments 1 to 41, wherein at least one paper layer 10 of the one or more non-paper layers 10 comprise a paper insulating material 12.

43. The insulated paper product 100 of embodiment 42, wherein the paper insulating material 12 comprises perlite, perlite coated with copper ions, expanded perlite, perlite hollow microspheres (such as available from Richard Baker Harrison Ltd., UK, or CenoStar Corporation (US), or Sil-Cel® microcellular aluminum silicate filler particles made by creating a structure of multicellular spherical bubbles comprising perlite, available from Silbrico (US), Sil-Cel® microspheres are available in a range of particle sizes, and may be coated or uncoated, or Dicaperl HP-2000 perlite microspheres, as sold by Dicalite (US), or flaked or milled perlite (such as Dicapearl LD1006 also sold by Dicalite), porous volcanic materials (such as pumice), vermiculite (including MicroLite® vermiculite dispersions, available from Dicalite), hollow expanded vermiculite, glass foams (such as Owens Corning), recycled glass foams (such as manufactured by GrowStone Inc.), cellular glass insulation materials, cenospheres (such as available from CenoStar Corp.), glass bubbles (such as available from 3M under the trade designations iM30K, iM16k, and K20, as well as Q-Cel glass), ceramic microspheres, plastic microspheres, and synthetic hollow microspheres (such as available from Kish Company Inc.), silica aerogels (such as those available from Aspen Aerogels, and those that may be incorporated into paints and coatings under the Enova® and Lumira® brand from Cabot), microporous polyolefin-based aerogels (such as disclosed in US Patent Application Publication No. 2016/0272777 to Aspen Aerogels Inc.), organic aerogels such as those disclosed in PCT WO 2019121242 to Henkel AG & Co. KGAA which comprise thiol-epoxy based aerogels, xerogels (i.e., collapsed aerogels), seagels (i.e., microfoams made from agar and alginates), foamed starch, foamed paper pulp, agar, foamed agar, alginates, foamed alginates, bismuth oxychloride, metalized ceramics, metalized fibers, cadmium yellow pigment (cadmium disulfide), or any combination thereof. Examples of commercially available insulating materials 12 include, but are not limited to, FOAMGLAS® products commercially available from Owens Corning (Pittsburgh Pa.); and Growstone products commercially available from Growstone, LLC, a subsidiary of Earthstone International Inc. (Santa Fe, N. Mex.). Recycled glass suitable for use as insulating materials 12 is typically crushed to a finely divided powder and mixed with a blowing agent, e.g., carbon or limestone. It is then passed into a furnace hot enough to begin to melt the glass. As the glass powder particles begin to fuse, the blowing agent gives off a gas or vapor, forming bubbles inside the glass. This generates a porous, mostly closed cell glass foam, with high thermal and sound insulation properties. Vermiculite may also be used as a suitable insulating material 12. Vermiculite is a hydrous phyllosilicate mineral that undergoes significant expansion when heated. Exfoliation occurs when the mineral is heated sufficiently, and the effect is routinely produced in commercial furnaces. Vermiculite is formed by weathering or hydrothermal alteration of biotite or phlogopite.

44. The insulated paper product 100 of embodiment 42 or 43, wherein the paper insulating material 12 comprises perlite (e.g., in the paper 10, the adhesive 40, the coating 30, and/or the emissivity coating 30), aerogel (e.g., in the paper 10 and/or the adhesive 40), glass bubbles (e.g., in the adhesive 40 and/or the coating 30), activated carbon (e.g., in the paper 10, the adhesive 40, the coating 30, and/or the emissivity coating 30), or any combination thereof.

45. The insulated paper product 100 of any one of embodiments 1 to 44, wherein the insulating material 12 comprises particles having an average particle size of less than about 1000 microns (μm) (or any average particle size greater than about 1.0 μm to less than about 1000 μm, in increments of 1.0 μm, e.g., 25 μm, or any range of average particle size less than about 1000 μm, in increments of 1.0 μm, e.g., from about 50 μm to about 500 μm). For example, perlite particles typically have an average particle size ranging from about 5.0 to about 150 μm, aerogel particles typically have an average particle size ranging from about 10 to about 800 μm, and glass bubble particles typically have an average particle size ranging from about 10.0 to about 50 μm.

46. The insulated paper product 100 of any one of embodiments 1 to 45, wherein the insulating material 12 comprises particles having a multi-modal particle size distribution.

47. The insulated paper product 100 of any one of embodiments 1 to 46, wherein any paper layer 10 that contains insulating material 12 comprises from 4.0 weight percent (wt %) to 99.0 wt % fibers 11, and from about 96.0 wt % to about 1.0 wt % insulating material 12, based on a total weight of the paper layer 10. It should be understood that a given paper layer 10 that contains insulating material 12 can have (a) any weight percent of fibers 11 between 4.0 wt % and 99.0 wt % (i.e., in increments of 0.1 wt %, e.g., 55.5 wt %, or any range of values between 4.0 wt % and 99.0 wt %, in increments of 0.1 wt %, e.g., from 35.6 wt % to 74.1 wt %).

48. The insulated paper product 100 of any one of embodiments 1 to 47, wherein any paper layer 10 that contains insulating material 12 comprises from 5.0 wt % to 75.0 wt % fibers 11, and from about 95.0 wt % to about 25.0 wt % insulating material 12, based on a total weight of the paper layer 10.

49. The insulated paper product 100 of any one of embodiments 1 to 48, wherein the insulating material 12 has a material density of less than 1.0 gram per cubic centimeter (g/cm$^3$), more typically, less than 0.6 g/cm$^3$. It should be understood that the insulating material 12 can have any material density less than 1.0 g/cm$^3$ such as from greater than 0.01 g/cm$^3$ to about 0.99 g/cm$^3$ (or any value between 0.01 and 0.99, in increments of 0.01 g/cm$^3$, e.g., 0.48 g/cm$^3$, or any range of values between 0.01 and 0.99, in increments of 0.01 g/cm$^3$, e.g., from 0.10 g/cm$^3$ to 0.50 g/cm$^3$).

50. The insulated paper product 100 of any one of embodiments 1 to 49, wherein at least one layer 10 of said one or more paper layers 10 has a layer density of less than 1.0 g/cm$^3$. It should be understood that the at least one layer 10 can have any layer density less than 1.0 g/cm$^3$ such as from greater than 0.01 g/cm$^3$ to about 0.99 g/cm$^3$ (or any value between 0.01 and 0.99, in increments of 0.01 g/cm$^3$, e.g., 0.78 g/cm$^3$, or any range of values between 0.01 and 0.99, in increments of 0.01 g/cm$^3$, e.g., from 0.20 g/cm$^3$ to 0.60 g/cm$^3$). It should be further understood that any number of layers 10 of said one or more paper layers 10 may have an independent layer density, each of which is less than 1.0 g/cm$^3$ (or any value between 0.01 and 0.99, in increments of 0.01 g/cm$^3$, e.g., 0.88 g/cm$^3$, or any range of values between 0.01 and 0.99, in increments of 0.01 g/cm$^3$, e.g., from 0.15 g/cm$^3$ to 0.55 g/cm$^3$).

51. The insulated paper product 100 of any one of embodiments 1 to 50, wherein the insulated paper product 100 is molded to form a three-dimensional object (e.g., a cup 62 or container 60).

52. A storage container 60 comprising the insulated paper product 100 of any one of embodiments 1 to 51. See, FIGS. 9A-9C.

53. The storage container 60 of embodiment 52, wherein the storage container 60 comprises a storage volume 66 at least partially surrounded by one or more container walls 68.

54. The storage container 60 of embodiment 52 or 53, wherein the storage volume 66 is completely surrounded by or surroundable (i.e., the storage container 60 can be configured to surround the storage volume 66) by one or more container walls 68.

55. The storage container 60 of embodiment 53 or 54, wherein the one or more container walls 68 comprise the insulated paper product 100 of any one of embodiments 1 to 49.

56. The storage container 60 of embodiment 53 to 55, wherein the one or more container walls 68 comprise a gypsum layer, a clay-containing layer, a polymer coating, a pigment-containing layer, a bismuth oxychloride-containing layer, a mica containing layer, an aerogel containing layer, a fabric layer (e.g., a nonwoven, woven or knit fabric layer), a fiber-reinforcement layer (e.g., a layer of unidirectional fibers), a layer of insulating material 12, a metal film layer, a foam layer, a layer of air, a coating that lowers an emissivity of the one or more container walls (e.g., such as mica, bismuth oxychloride, zinc oxide, zinc sulfide, kaolin clay, or cadmium sulfide), a coating that lowers a thermal conductivity of the one or more container walls, a coating that enhances a water-repellency of the one or more container walls such as a wax, or a fluorocarbon, or a reactive cross-linking agent such as an epoxy or a urethane, or a silicone-based coating, or one or more coatings mentioned in U.S. Patent Application Publication No. 2019/077537, or any combination thereof.

57. The storage container 60 of any one of embodiments 52 to 56, wherein the storage container 60 comprises an insulating wrapper for a food item.

Figure 9A:
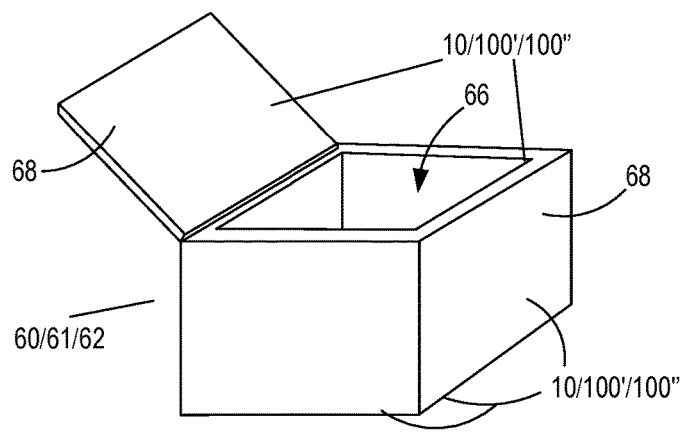
FIGS. 9A-9C depict exemplary storage containers comprising any one of the exemplary insulated paper products of the present invention.
Figure 9B:
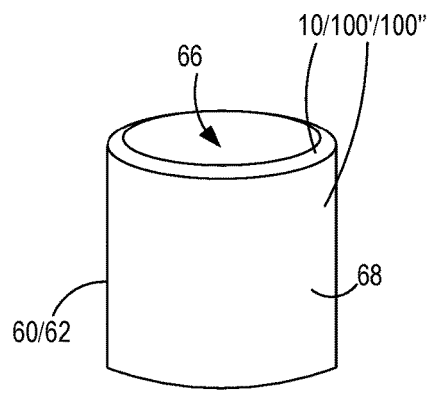
Figure 9C:
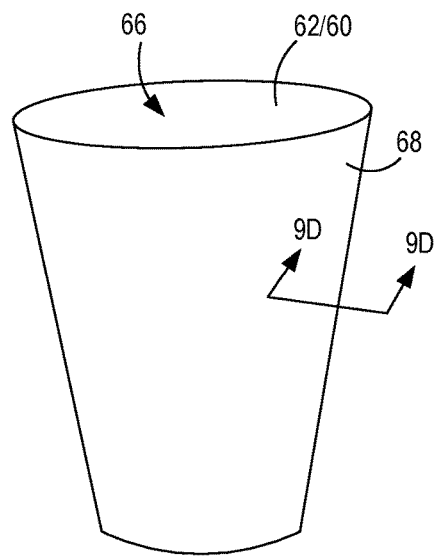
Figure 9D:
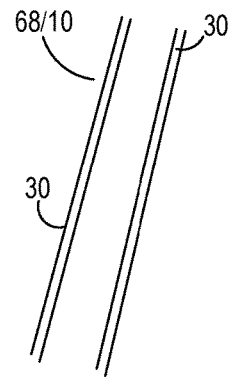
FIG. 9D depicts an exemplary cross-sectional view of the wall structure of the exemplary hot beverage cup shown in FIG. 9C.
Figure 10:
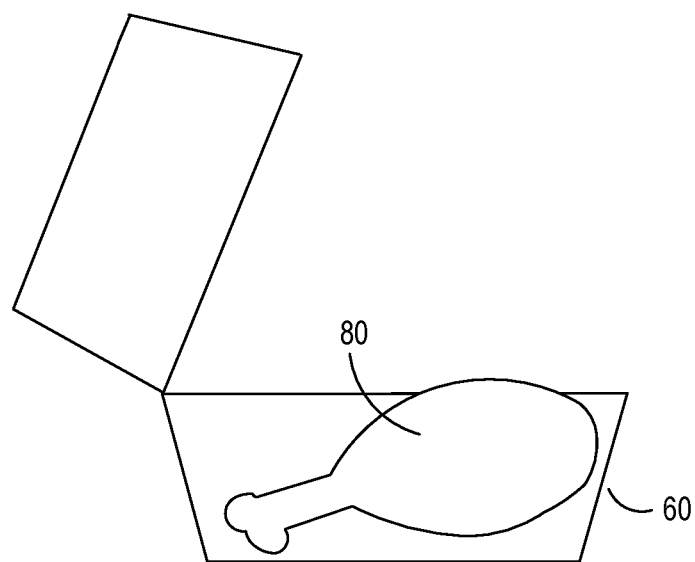
Figure 11:
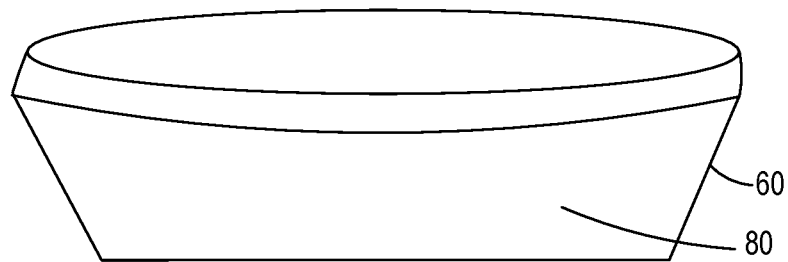
Figure 12:
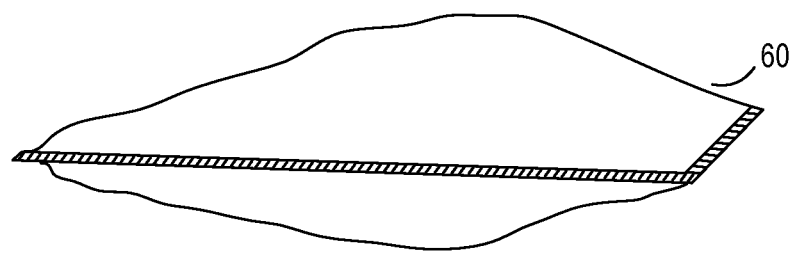
Figure 21:
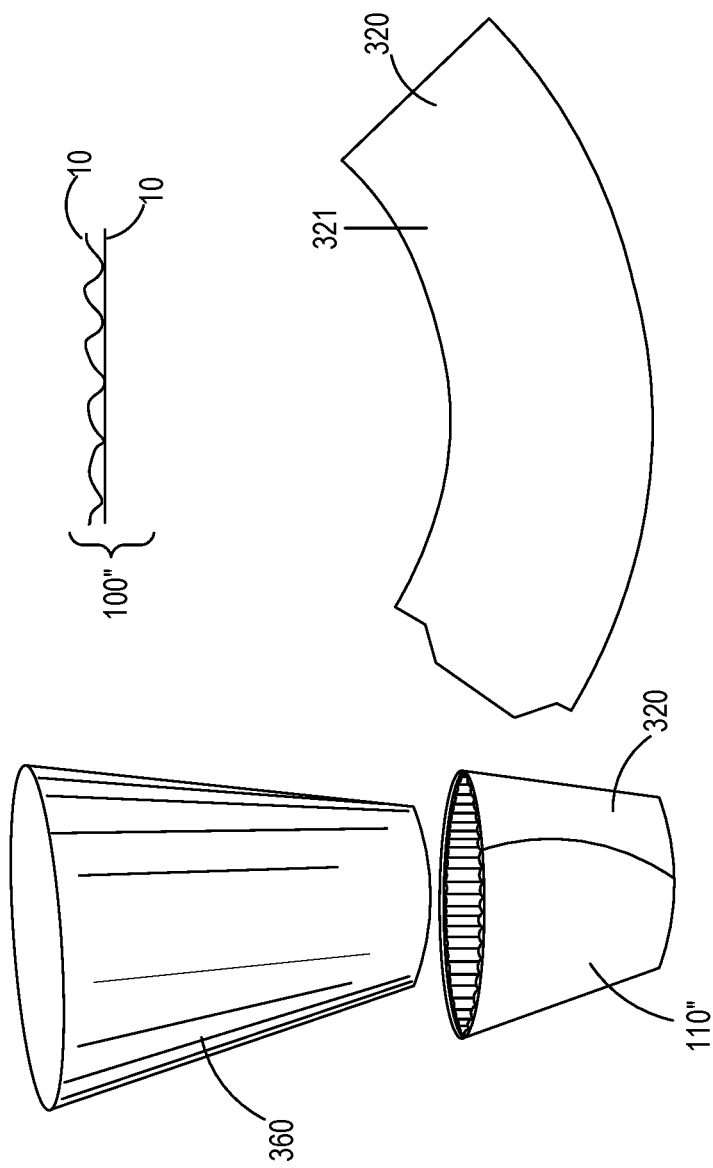
FIG. 21 depicts single faced corrugate paper hot beverage cup sleeves including the net and cross section.

58. The storage container 60 of any one of embodiments 52 to 56, wherein the container 60 comprises a cup 62, a mug, a flask, or a thermos 62. As shown in FIG. 9C, the storage container 60 may be a hot beverage cup 62, which could replace both STYROFOAM® cups, as well as lined paper cups along with the insulating paper ring currently provided to prevent burning fingers of the person holding the cup. As shown in FIG. 21, a corrugate paper sheet 110" formed from multiple paper layers 10 may be formed into a cup sleeve 320 having a cup sleeve outer surface 321. Cup sleeve 320 may be sized to receive a nestable cup 360.

59. The storage container 60 of any one of embodiments 52 to 56, wherein the container 60 comprises a clam shell type box packaging 60 for hot food 80. Such a container may be made via molding pulp using a vacuum forming machine. See, for example, FIG. 10.

60. The storage container 60 of any one of embodiments 52 to 56, wherein the container 60 comprises a salad container 60 for chilled food 80. See, for example, FIG. 11.

61. The storage container 60 of any one of embodiments 52 to 56, wherein the container 60 comprises a padded envelope 60. See, for example, FIG. 12.

Figure 13A:
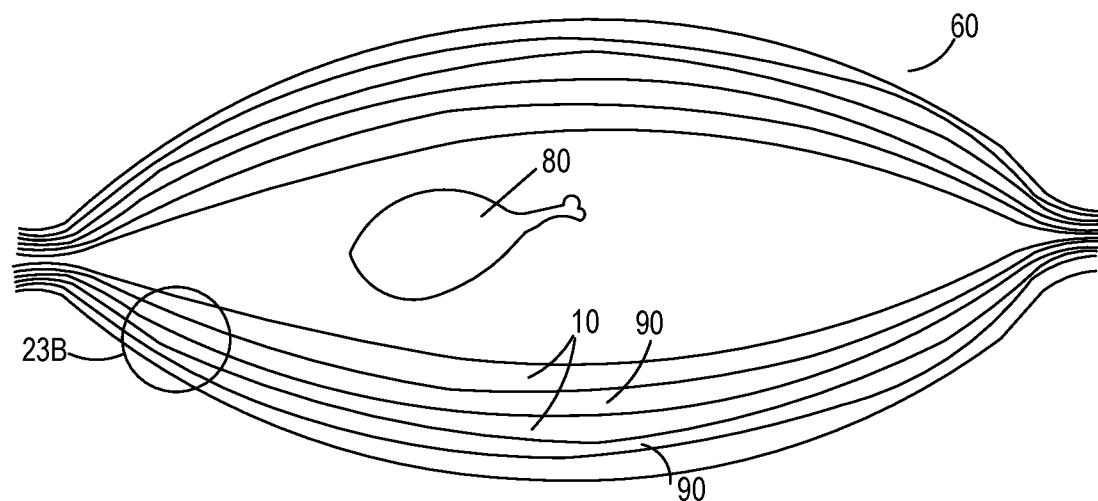
Figure 13B:
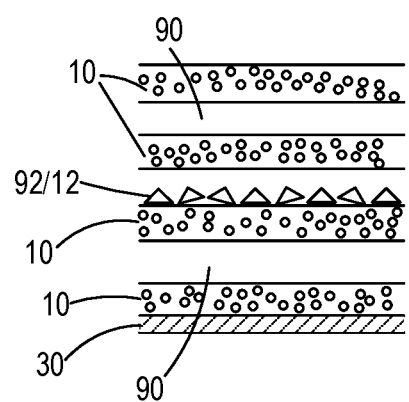
FIG. 13B depicts a close-up cross-sectional view of the wall structure of the exemplary shipping container shown in FIG. 13A.

62. The storage container 60 of any one of embodiments 52 to 56, wherein the container 60 comprises a shipping container 60. See, for example, FIG. 13A. As shown in FIG. 13B, exemplary shipping container 60 comprises (i) multiple thinner paper layers 10, each of which optionally includes insulating materials 12 incorporated therein, optionally with (ii) a non-uniform distribution of material particles 92 (which could be insulating material 12), optionally (iii) air 90 or an insulative filler material between the layers 10, and (iv) optionally additional coating(s) 30 on one or more of the paper layers 10.

Figure 14:
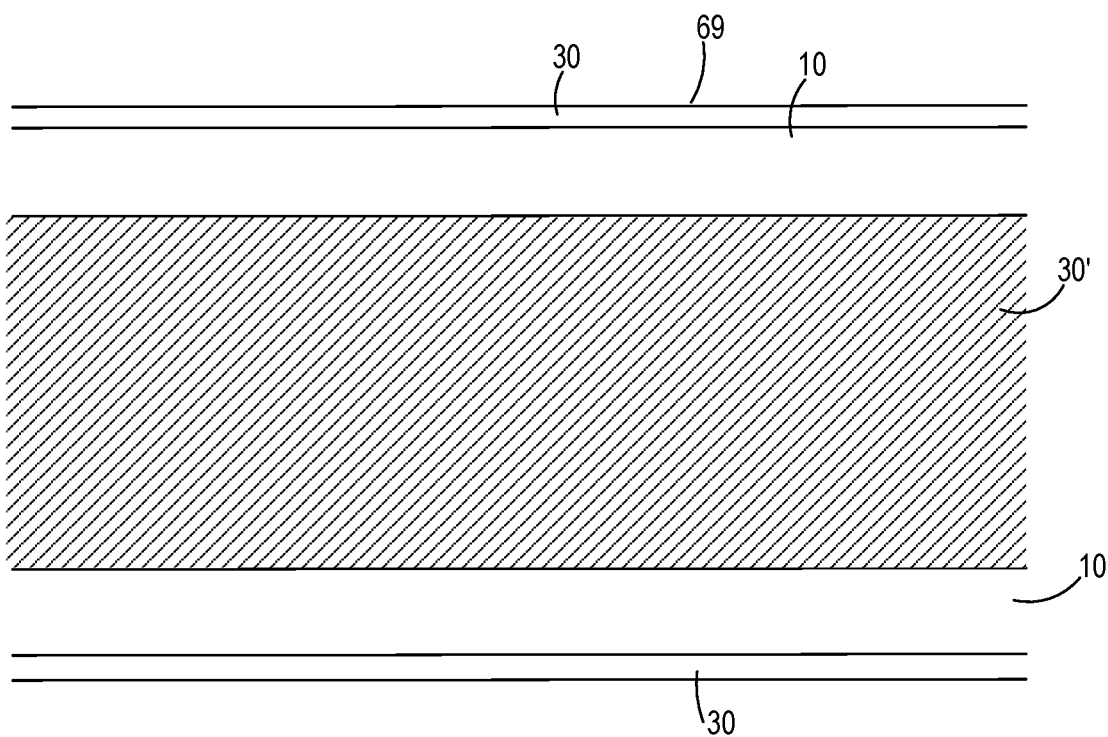
FIG. 14 depicts an exemplary cross-sectional view of a wall structure of an exemplary shipping container.

63. The storage container 60 of embodiment 62, wherein the shipping container 60 comprises shipping container walls 69 that comprise a closed cell foam 30'. See, for example, FIG. 14. In this embodiment, the closed cell foam 30' may be a biodegradable foam 30', for instance a foamed starch such as GreenCell® sold by KTM Industries Inc. Holt, Mich., or a foamed alginate, or pectin, or gelatin, or agar material that has been foamed through one means or another, and optionally chemically cross-linked to a certain extent. As shown in FIG. 14, the shipping container 60 may include paper layers 10 that may optionally include insulating material 12, and may also contain a thermal barrier coating 30. The coating 30 could be designed to reduce radiative heat transfer, or it could be designed to reduce conductive heat transfer, or it could be designed to reduce both.

64. A storage container 60 of any one of embodiments 52 to 63 or the insulated paper product 100 of any one of embodiments 1 to 51, wherein the insulating coating 30 is present on (i) an inner surface 63, (ii) an outer surface 13/15, or (iii) both (i) and (ii) of the storage container 60 or the insulated paper product 100, the insulating coating 30 having a low thermal emissivity or thermal barrier property. As used herein, the phrase "a low thermal emissivity" refers to a thermal emissivity of less than 0.90, as measured using Thermal Emissivity Method #3 Recommended by Flir Systems Inc. (described in the "Example" section below). Suitable materials for use in a given "emissivity coating" include, but are not limited to, bismuth oxychloride, mica flakes, perlite, kaolin, and any combination thereof (e.g., mica flakes partially or completely coated with bismuth oxychloride).

65. A storage container 60 of embodiment 64 or the insulated paper product 100 of any one of embodiments 1 to 51, wherein the treatment comprising a coating 20/30 on (i) an inner surface 63, (ii) an outer surface 13/15, or (iii) both (i) and (ii) of the storage container 60 or the insulated paper product 100, the coating 30 comprising one or more materials that increase the water resistance of (i) the inner surface 63, (ii) the outer surface 13/15, or (iii) both (i) and (ii) of the storage container 60 or the insulated paper product 100.

66. A storage container 60 of any one of embodiments 52 to 65 or the insulated paper product 100 of any one of embodiments 1 to 51, further comprising a coating 20/30 on (i) an inner surface 63, (ii) an outer surface 13/15, or (iii) both (i) and (ii) of the storage container 60 or the insulated paper product 100, the coating 20/30 water-proofing (i) the inner surface 63, (ii) the outer surface 13/15, or (iii) both (i) and (ii) of the storage container 60 or the insulated paper product 100. By "waterproofing," it is meant that the outer surface 13/15 of the storage container 60 or the insulated paper product 100 can be in contact with water for 24 hours and maintain its structural integrity.

Methods of Making Insulated Paper Products

67. A method of making the insulated paper product 100 of any one of embodiments 1 to 51, said method comprising coating the one or more paper layers on at least one side with the insulating coating 30.

68. The method of embodiment 67, said method further comprising at least one papermaking step to form the one or more paper layers.

69. The method of embodiment 67 or 68, said method further comprising a treatment step to impart water or grease resistance to the insulated paper product 100.

70. The method of embodiment 69, wherein the treatment comprises adding one or more treatment additives to one or more of the one or more paper layers 10.

71. The method of embodiment 69 or 70, wherein the treatment comprises adding one or more treatment additives to the insulating coating 30.

72. The method of any one of embodiments 69 to 71, wherein the treatment comprises adding a water or grease resistance layer comprising one or more treatment additives onto the insulated paper product 100.

73. The method of any one of embodiments 69 to 72, wherein the insulating coating 30 is applied over the water or grease resistance layer 30.

74. The method of any one of embodiments 69 to 73, wherein the water or grease resistance layer is applied onto an outer surface of the insulated paper product 100 opposite the insulating coating 30.

75. The method of any one of embodiments 70 to 74, wherein the one or more treatment additives comprise a wax emulsion, a latex binder, Epotal 5440 (BASF) (i.e., a styrene acrylic based dispersion), Rhoplex P-376 (Dow) (i.e., a styrene acrylic binder), Diofan B204 (Solvay) (i.e., a polyvinylidene chloride (PVDC) latex), Barrier-Grip 9471A (IGI) (i.e., a styrene acrylic/PE wax/clay blend), Daran SL143 (Owensboro) (i.e., a polyvinylidene chloride (PVDC) latex), or any combination thereof.

76. The method of any one of embodiments 70 to 75, wherein the one or more treatment additives comprise a wax emulsion, a latex binder, Epotal 5440 (BASF) (i.e., a styrene acrylic based copolymer emulsion), Rhoplex P-376 (Dow) (i.e., a styrene acrylic copolymer emulsion binder), Diofan B204 (Solvay) (i.e., a poly(vinylidene chloride) (PVDC) latex), Barrier-Grip 9471A (IGI) (i.e., a blend including a styrene acrylic copolymer emulsion, a poly(ethylene) wax and clay), Daran SL143 (Owensboro) (i.e., a poly(vinylidene chloride) (PVDC) latex), or any combination thereof.

77. The method of any one of embodiments 67 to 76, said method further comprising incorporating one or more additives into at least one paper layer 10 within the one or more paper layers 10. Suitable additives include, but are not limited to, one or more insulating materials 12, copper ions, waxes, synthetic (e.g., polymeric or glass) fibers, silica, surface modified silica, transition metal surface modified silica, cyclodextrin, sodium bicarbonate, silicones to impart grease and water resistance, metalized ceramic particles, metalized fibers, cationic starches, cationic polymers, such as cationic guar gum, poly(ethylene imine) (e.g., poly(ethylene imine marketed as Polymin P and available from Aldrich Chemical), fillers, sizes, binders, clays including bentonite clay, kaolin clay, and other minerals, calcium carbonate, calcium sulfate, and other materials that may be added to paper products for different reasons, and any combinations thereof. The filler may make the paper more receptive to printing, for instance, or make the paper glossy. Many fillers have a density greater than 1.0 g/cm$^3$. Flocculants and retention aids, may also be included such as high molecular weight poly(acrylamide), poly(ethylene imine), cationic quar gum, and other cationic polymers. Sizes and binders may also be added to help provide strength to papers, and can include starches, hydrocolloids, artificial and natural polymer latexes, such as RHOPLEX® acrylic resins from Dow Chemical and ROVENE® binders from Mallard Creek Polymers (Charlotte N.C.). Water soluble polymers, such as poly(vinyl alcohol), and poly(acrylic acid) may also be added to the paper. Sometimes, water resistance on the final box is required. Vapor-Guard R5341B or Barrier Grip 9471A (The International Group Inc., Titusville Pa.) are useful as barrier coatings that provide a given paper layer 10 with a degree of grease and/or water resistance.

78. The method of any one of embodiments 67 to 77, said method further comprising forming at least one fluted paper layer 10 within the one or more paper layers 10. See, for example, FIGS. 6A-6D.

79. The method of any one of embodiments 67 to 78, further comprising: applying at least one additional layer onto the insulated paper product 100. The additional layer could be another layer 20 of insulating material 12, a coating 20/30 (e.g., a coating 30 that increases or decreases an emissivity of a paper layer 10/100" or an integrated product 100"), a non-paper layer 30, a layer of air 90, or any combination thereof. See, for example, FIGS. 6A-6D and 14.

80. The method of any one of embodiments 67 to 79, said method further comprising forming a storage container 60.

81. The method of embodiment 80, wherein the storage container 60 comprises the storage container 60 of any one of embodiments 52 to 66.

82. The method of any one of embodiments 67 to 81, said method further comprising forming at least one paper layer 10 within the one or more paper layers 10 using recycled insulated paper product 100 of any one of embodiments 1 to 51 For example, one method of making at least one paper layer 10 and a container 60 formed therefrom comprises forming a corrugated structure 100" with at least one outer ply/liner 21/22 that contains fiber 11 and insulating material 12, and a fluted median ply/liner 23 without insulating material 12, comprising: suspending cellulose fibers 11 in water to make paper pulp 11; forming a fibrous first layer 10 from the pulp 11; suspending cellulose fibers 11 in water, adding voided materials (e.g., hollow insulating material 12), optionally adding surface active agents, optionally adding a flocculent; forming this layer 10 on top of the first layer of pulp 10; suspending cellulose fibers 11 in water to make paper pulp 11; forming a fibrous top layer 10 on top of the second layer 10; pressing and drying the resultant three-ply insulated paper sheet 100'; optionally coating at least one of the surfaces of the three-ply insulated paper sheet 100' with a coating 30 selected from comprising aluminum, silver, mica, sericite, zinc oxide, zinc sulfide, cadmium sulfide, bismuth oxychloride, bismuth oxychloride coated mica, bismuth vanadate, gypsum, or combinations thereof; passing a paper sheet 10 through a corrugator to make a fluted layer 23 while adhering two insulated paper sheets 100' as liner boards 21/22 to the fluted layer 23 to form corrugated board 100"; optionally adding an additional fluted layer 23 and another liner board 21 or 22 to make a double walled corrugated structure 100", containing three insulated liner boards 21/22 and two fluted layers 23; cutting the double walled corrugated structure 100" into the form/shape of a box 60; and allowing the off-cuts (e.g., scraps from the cutting step) to be sent back to the repulping mill mixed with off-cuts from non-insulating board. Another method of making at least one paper layer 10 and a container 60 formed therefrom comprises forming a corrugated structure 100" with at least one outer ply/liner 21/22 that contains a paper layer 10 and an insulating material layer 20, and a fluted median ply/liner 23 without insulating material 12, comprising: suspending cellulose fibers 11 in water to make paper pulp 11, and optionally adding a flocculant; forming a fibrous first layer 10 from pulp 11; suspending voided materials (e.g., hollow insulating material 12) in water, optionally adding surface active agents, and optionally adding a flocculent and/or a binder; forming this layer 20 on top of the first layer 10 of pulp 11, through curtain coating, slot-die coating, rod coating, spray application, etc.; suspending cellulose fibers 11 in water to make paper pulp 11 optionally adding a flocculant; forming a fibrous top layer 10 on top of the second layer 20; pressing and drying the resultant insulated paper sheet 100'; optionally coating at least one of the surfaces of the resultant insulated paper sheet 100' with a coating 30 comprising aluminum, silver, mica, sericite, zinc oxide, zinc sulfide, cadmium sulfide, bismuth oxychloride, bismuth oxychloride coated mica, bismuth vanadate, gypsum, or combinations thereof; passing a paper sheet 10 through a corrugator to make a fluted layer 23 while adhering two insulated paper sheets 100' as liner boards 21/22 to the fluted layer 23 to form corrugated board 100"; optionally adding an additional fluted layer 23 and another liner board 21 or 22 to make a double walled corrugated structure 100", containing three insulated liner boards 21/22 and two fluted layers 23; cutting the double walled corrugated structure 100" into the form/shape of a box 60; and allowing the off-cuts (e.g., scraps from the cutting step) to be sent back to the repulping mill mixed with off-cuts from non-insulating board. Yet another method of making at least one paper layer 10 and a container 60 formed therefrom comprises forming a corrugated structure 100" with at least one outer ply/liner 21/22 that contains fiber 11 and insulating material 12, and a fluted median ply/liner 23 that comprises insulating material 12, comprising: suspending cellulose fibers 11 in water to make paper pulp 11; forming a fibrous first layer 10 from the pulp 11; suspending cellulose fibers 11 in water, adding voided materials (e.g., hollow insulating material 12), optionally adding surface active agents, optionally adding a flocculent; forming this layer 10 on top of the first layer of pulp 10; suspending cellulose fibers 11 in water to make paper pulp 11; forming a fibrous top layer 10 on top of the second layer 10; pressing and drying the resultant three-ply insulated paper sheet 100'; optionally coating at least one of the surfaces of the three-ply insulated paper sheet 100' with a coating 30 selected from comprising aluminum, silver, mica, sericite, zinc oxide, zinc sulfide, cadmium sulfide, bismuth oxychloride, bismuth oxychloride coated mica, bismuth vanadate, gypsum, or combinations thereof; passing the resultant three-ply insulated paper sheet 100' through a corrugator to make a fluted layer 23 while adhering two insulated paper sheets 100' as liner boards 21/22 to the fluted layer 23 to form corrugated board 100"; optionally adding an additional fluted layer 23 and another liner board 21 or 22 to make a double walled corrugated structure 100", containing three insulated liner boards 21/22 and two fluted layers 23; cutting the double walled corrugated structure 100" into the form/shape of a box 60; and allowing the off-cuts (e.g., scraps from the cutting step) to be sent back to the repulping mill mixed with off-cuts from non-insulating board. Yet another method of making at least one paper layer 10 and a container 60 formed therefrom comprises forming a corrugated structure 100" with at least one outer ply/liner 21/22 that contains a paper layer 10 and an insulating material layer 20, and a fluted median ply/liner 23 with an insulating layer 20, comprising: suspending cellulose fibers 11 in water to make paper pulp 11, and optionally adding a flocculant; forming a fibrous first layer 10 from pulp 11; suspending voided materials (e.g., hollow insulating material 12) in water, optionally adding surface active agents, and optionally adding a flocculent and/or a binder; forming this layer 20 on top of the first layer 10 of pulp 11, through curtain coating, slot-die coating, rod coating, spray application, etc.; suspending cellulose fibers 11 in water to make paper pulp 11 optionally adding a flocculant; forming a fibrous top layer 10 on top of the second layer 20; pressing and drying the resultant insulated paper sheet 100'; optionally coating at least one of the surfaces of the resultant insulated paper sheet 100' with a coating 30 comprising aluminum, silver, mica, sericite, zinc oxide, zinc sulfide, cadmium sulfide, bismuth oxychloride, bismuth oxychloride coated mica, bismuth vanadate, gypsum, or combinations thereof; passing the insulated paper sheet 100' through a corrugator to make a fluted layer 23 while adhering two insulated paper sheets 100' as liner boards 21/22 to the fluted layer 23 to form corrugated board 100"; optionally adding an additional fluted layer 23 and another liner board 21 or 22 to make a double walled corrugated structure 100", containing three insulated liner boards 21/22 and two fluted layers 23; cutting the double walled corrugated structure 100" into the form/shape of a box 60; and allowing the off-cuts (e.g., scraps from the cutting step) to be sent back to the repulping mill mixed with off-cuts from non-insulating board.

83. The method of any one of embodiments 67 to 82, said method further comprising a molding step so as to form a three-dimensional object from the insulated paper product 100.

84. The method of embodiment 83, wherein the molding step comprises a pressure molding step, a thermoforming step, a vacuum forming step, or any combination thereof.

85. The method of any one of embodiments 67 to 84, wherein each paper layer 10 that contains insulating material 12 comprises from 15.0 wt % to 99.0 wt % fibers 11, and from about 85.0 wt % to about 1.0 wt % insulating material 12, based on a total weight of the paper layer 10.

86. The method of any one of embodiments 67 to 85, wherein each paper layer 10 that contains insulating material 12 comprises from 15.0 wt % to 80.0 wt % fibers 11, and from about 85.0 wt % to about 20.0 wt % insulating material 12, based on a total weight of the paper layer 10.

87. The method of any one of embodiments 67 to 86, wherein the insulating material 12 has a material density of less than 1.0 g/cm$^3$ (or any value between 0.01 g/cm$^3$ and 0.99 g/cm$^3$, in increments of 0.01 g/cm$^3$, e.g., 0.48 g/cm$^3$, or any range of values between 0.01 g/cm$^3$ and 0.99 g/cm$^3$, in increments of 0.01 g/cm$^3$, e.g., from 0.10 g/cm$^3$ to 0.50 g/cm$^3$).

88. The method of any one of embodiments 67 to 87, wherein at least one layer 10 of the one or more paper layers 10 has a layer density of less than 1.0 g/cm$^3$ (or any value between 0.01 g/cm$^3$ and 0.99 g/cm$^3$, in increments of 0.01 g/cm$^3$, e.g., 0.78 g/cm$^3$, or any range of values between 0.01 g/cm$^3$ and 0.99 g/cm$^3$, in increments of 0.01 g/cm$^3$, e.g., from 0.20 g/cm$^3$ to 0.75 g/cm$^3$). It should be further understood that any number of layers 10 of the one or more paper layers 10 may have an independent layer density, each of which is less than 1.0 g/cm$^3$ (or any value between 0.01 g/cm$^3$ and 0.99 g/cm$^3$, in increments of 0.01 g/cm$^3$, e.g., 0.44 g/cm$^3$, or any range of values between 0.01 g/cm$^3$ and 0.99 g/cm$^3$, in increments of 0.01 g/cm$^3$, e.g., from 0.18 g/cm$^3$ to 0.85 g/cm$^3$).

89. The method of any one of embodiments 67 to 88, wherein the integral paper product 100 has an integral paper product density of less than 1.0 g/cm$^3$ (or any value between 0.01 g/cm$^3$ and 0.99, g/cm$^3$ in increments of 0.01 g/cm$^3$, e.g., 0.77 g/cm$^3$, or any range of values between 0.01 g/cm$^3$ and 0.99 g/cm$^3$, in increments of 0.01 g/cm$^3$, e.g., from 0.18 g/cm$^3$ to 0.53 g/cm$^3$).

Methods of Using Insulated Paper Products

90. A method of using the insulated paper product 100 of any one of embodiments 1 to 51 or the storage container 60 of any one of embodiments 452 to 66, said method comprising: insulating an object via the insulated paper product 100 or the storage container 60.

91. The method of embodiment 90, wherein the object is a surface.

92. The method of embodiment 90, wherein the object is a food item, a medicine, or any other item that is desirably kept at a cool temperature (e.g., a temperature below room temperature or a refrigerating temperature) or at an elevated temperature (e.g., a temperature above room temperature or a hot-out-of-the-oven temperature).

93. The method of embodiment 90 or 92, wherein the object is a food item.

94. The method of any one of embodiments 90 to 93, wherein the method uses the storage container 60 of any one of embodiments 52 to 66.

95. The method of any one of embodiments 90 to 94, wherein the insulated paper product 100 comprises an insulating wrapper for a food item.

96. The method of any one of embodiments 90 to 94, wherein the method uses the storage container 60 and the storage container 60 comprises a box 61, a container 62 for temporarily housing a liquid (not shown), a cup, a mug, a flask, or a thermos 62, a clam shell 60 for hot food 80 (See, for example, FIG. 10.), a salad container 60 for chilled food 80 (See, for example, FIG. 11.), a padded envelope 60 (See, for example, FIG. 12.), a shipping container 60 (See, for example, FIG. 13A), a shipping container 60 comprising shipping container walls 69 that comprise a closed cell foam 30' (See, for example, FIG. 14), or any combination thereof. For example, in one method of use, the method comprises a method of maintaining an object at a controlled temperature comprising: heating or chilling an object (e.g., food, medicine, meat, fish, salad, vegetables, flowers, pharmaceuticals, biological specimens) to a pre-determined temperature T; packaging the object inside any herein-described storage container 60.

97. The method of any one of embodiments 90 to 94 and 96, wherein the storage container 60 of dimensions 12"×10"×7" is capable of keeping a combination of 900 g cooked pork (or simulant) and 1800 g of frozen water gel packs (conditioned to −20° C. prior to placing into the container) below 0° C. after 10 hours in an external temperature of 23° C.

98. The method of any one of embodiments 90 and 92, further comprising transporting the object within the insulated paper product 100 or the storage container 60.

99. The method of any one of embodiments 90 and 92 to 98, further comprising shipping the object within the insulated paper product 100 or the storage container 60. For example, in one method of use, the method comprises a method of shipping an object at a controlled temperature comprising: chilling an object (e.g., food, medicine, meat, fish, salad, vegetables, flowers, pharmaceuticals, biological specimens) to below a spoiling temperature of the object; packaging the chilled object inside any herein-described storage container 60, along with frozen water gel packs, dry ice, etc.; closing the container; placing the storage container 60 into a vehicle (e.g., car, train, bus, airplane, etc.); transporting the package to a pre-determined destination; removing the storage container 60 from the vehicle; and delivering the storage container 60 to either the front door of a residence, or to the loading dock of a distribution center, or the entrance of a restaurant, or the receiving department of a business, wherein the temperature inside the unopened storage container 60 remains below the food spoiling temperature for at least 24 hours.

100. The method of any one of embodiments 90 to 99, further comprising repulping the insulated paper product 100 and/or the storage container 60 after said insulating step, wherein at least 80% of the insulating filler is removed from the pulp during the repulping operation.

101. The method of any one of embodiments 90 to 100, further comprising incorporating any fibers 11 and/or insulating particles 12 from a repulped insulated paper product 100 and/or a repulped storage container 60 into a newly formed insulated paper product 100 and/or a newly formed storage container 60.

In addition, it should be understood that although the above-described insulated paper products and methods are described as "comprising" one or more components or steps, the above-described insulated paper products and methods may "comprise," "consists of," or "consist essentially of" the above-described components or steps of the insulated paper products and methods. Consequently, where the present invention, or a portion thereof, has been described with an open-ended term such as "comprising," it should be readily understood that (unless otherwise stated) the description of the present invention, or the portion thereof, should also be interpreted to describe the present invention, or a portion thereof, using the terms "consisting essentially of" or "consisting of" or variations thereof as discussed below.

As used herein, the terms "comprises," "comprising," "includes," "including," "has," "having," "contains", "containing," "characterized by" or any other variation thereof, are intended to encompass a non-exclusive inclusion, subject to any limitation explicitly indicated otherwise, of the recited components. For example, an insulated paper product and/or method that "comprises" a list of elements (e.g., components, layers or steps) is not necessarily limited to only those elements (or components or steps), but may include other elements (or components or steps) not expressly listed or inherent to the insulated paper product and/or method.

As used herein, the transitional phrases "consists of" and "consisting of" exclude any element, step, or component not specified. For example, "consists of" or "consisting of" used in a claim would limit the claim to the components, materials or steps specifically recited in the claim except for impurities ordinarily associated therewith (i.e., impurities within a given component). When the phrase "consists of" or "consisting of" appears in a clause of the body of a claim, rather than immediately following the preamble, the phrase "consists of" or "consisting of" limits only the elements (or components or steps) set forth in that clause; other elements (or components) are not excluded from the claim as a whole.

As used herein, the transitional phrases "consists essentially of" and "consisting essentially of" are used to define an insulated paper product and and/or a method that includes materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of".

Further, it should be understood that the herein-described insulated paper products and/or methods may comprise, consist essentially of, or consist of any of the herein-described components, layers and features, as shown in the figures with or without any feature(s) not shown in the figures. In other words, in some embodiments, the insulated paper products of the present invention do not have any additional features other than those shown in the figures, and such additional features, not shown in the figures, are specifically excluded from the insulated paper products. In other embodiments, the insulated paper products of the present invention do have one or more additional features that are not shown in the figures.

The present invention is described above and further illustrated below by way of examples, which are not to be construed in any way as imposing limitations upon the scope of the invention. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLES

Insulated paper products similar to exemplary insulated paper products 100/100'/100"/60 shown and described in FIGS. 1-21 were prepared.

Example 1. Preparation of Insulated Paper Products

Test Methods:
% Solids Analysis:
A polystyrene disposable weigh boat was accurately weighed to 4 decimal places (tare mass). Approximately 1-2 gram of liquid was placed in the weigh boat, and promptly weighed to four decimal places (gross-wet mass.) Subtracting the tare from the gross-wet mass gives the net-wet mass. The weigh boat was carefully tilted and rocked from side to side, allowing the liquid to coat the bottom of the weigh boat evenly, then it was placed in a cupboard for 24-48 hours to evaporate at room temperature. The dry weigh boat was re-weighed to four decimal places (gross-dry mass). Subtracting the tare from the gross-dry mass gives the net-dry mass.

% solids=100*net-dry/net-wet pH:
All pH measurements were made using universal indicator paper, as supplied by Micro Essential Laboratories Inc. The color of the paper and the chart were compared under indoor fluorescent strip lighting.

Figure 15:
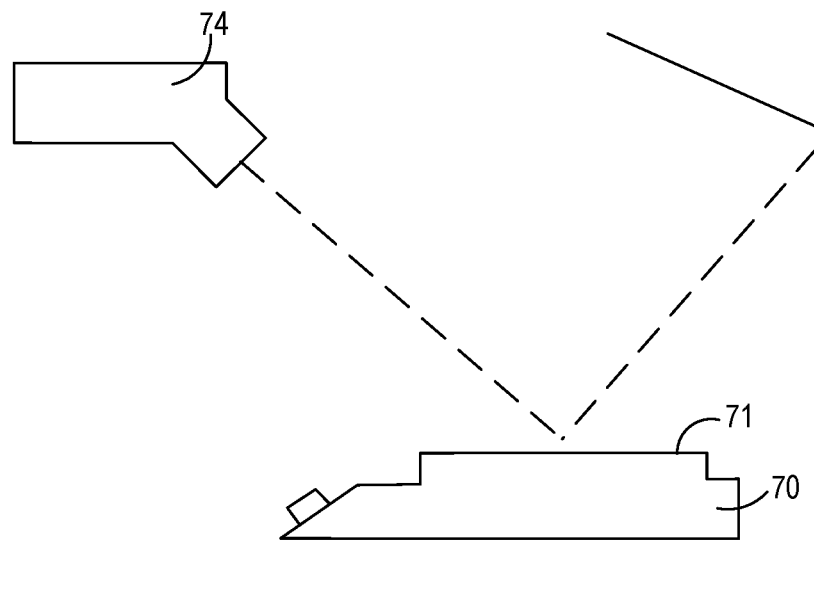
FIGS. 15-17 depict views of another apparatus that may be used to determine the relative emissivity of paper samples and/or insulating materials.
Figure 16:
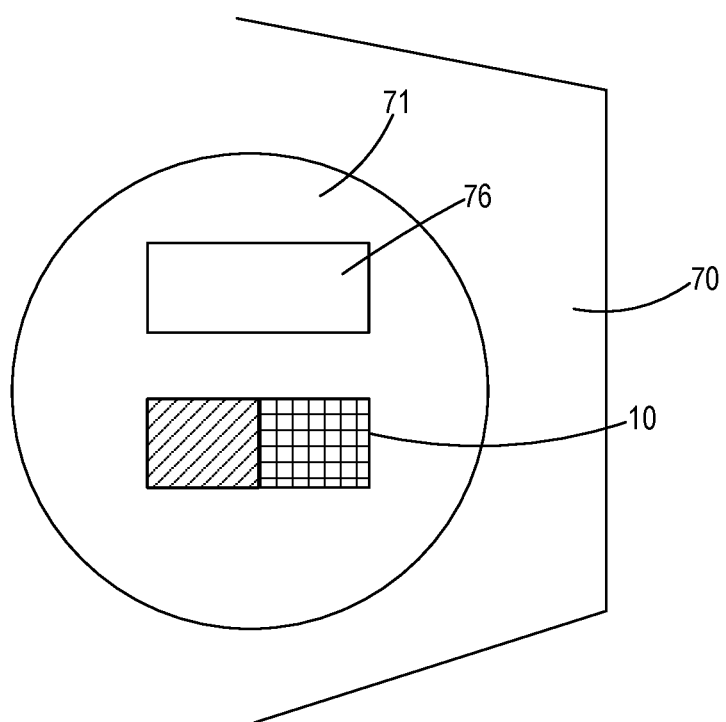
Figure 17:
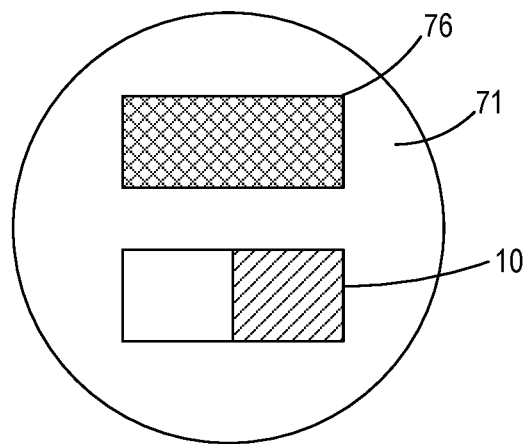

Thermal Emissivity Comparison Method #1 (via conduction):
A modified version of Leslie's cube was used to screen multiple materials rapidly. The equipment is depicted in FIG. 15. FIG. 16 shows the view from directly above the hotplate 70, viewing the sample 10 in visible light. FIG. 17 shows the thermal view using the Flir E40 thermal camera 74.

One complication with this test is that it highly thermally insulating materials will skew the results, as the method relies upon conduction of heat from the back to reach the same temperature. So, if the flux of heat traveling through is reduced significantly, then the black painted area will be cooling faster (through radiation) than sample area, leading to a slightly misleading result. For this reason, we developed several other tests to screen materials for emissivity.

Materials:
Paperboard sample(s) 10
Rectangular corrugated strips, 1.5"×3"
Calipers
Digital hot plate 70 that heats to at least 37° C. (98.6° F.) and with a heating surface 71 at least 113 mm in diameter
IR Camera 74 & Image Analysis Software
Timer
Polished aluminum strip 76, 0.75 mm thick, 2"×3"
Matte black spray paint (Rust-oleum High Performance Wheel, matte black)
3M Spray Adhesive Assumptions:
This test method assumes constant heat flow, and no edge losses or other effects from convection or radiation-based heat transfer (all the heat flows through the sample).

Method:
1. Set the IR camera 74 to have an emissivity value of 0.95, or similar.
2. Turn on the hot plate 70 and set the temperature to 37° C. Once the hot plate 70 has reached 37° C., sample testing can begin. The temperature can be checked by using the IR camera 74.
3. Cut 1.5"×3" cardboard strips. Spray them evenly with 3M aerosol adhesive.
4. Generously sprinkle the material 12 to be testing over the cardboard, then tap to remove the excess.
5. Mask one half of the cardboard with aluminum foil, then spray paint the unmasked half of the sample with the matte black paint. Allow to dry (~45 minutes).
6. Turn on the hot plate 70 and set the temperature to 37° C. Once the hot plate 70 has reached 37° C., sample testing can begin. The temperature can be checked by using the IR camera 74.

7. When ready to test:
Place the corrugated sample on top of the hot plate, painted side up
Place the polished aluminum also on the hotplate as a control.
Start a timer for 2 minutes 8. At the end of two minutes, take an IR image of the top surface 75 of the sample. Remove the cover plate and paper sample.

9. Repeat steps 6 & 7 until all samples have been tested.

Analysis:

Use the thermal images to compare whether the sample is more or less emissive than the shiny or black painted portions.

The portion of the sample painted black has a high emissivity (approx. 0.90), and thus shows up red and displays the correct temperature. The polished aluminum material has a low emissivity (approx. 0.03), and thus shows up blue and displays a lower temperature than the object actually is.

So, for this test, one should be able to say whether the emissivity of the test sample is higher, lower, or roughly equal to the emissivity of the black or silver samples.

Figure 18:
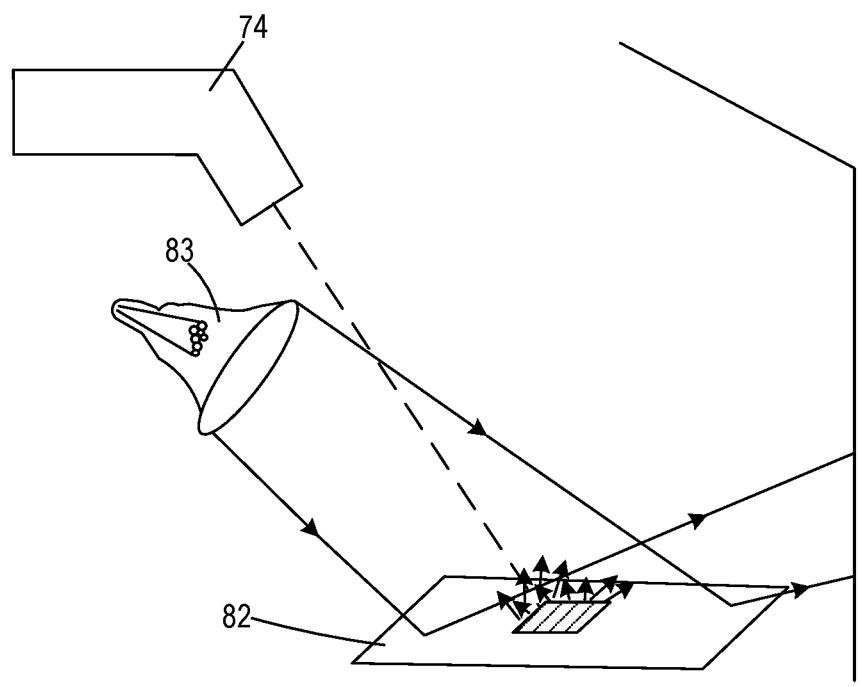
FIG. 18 depicts a view of another apparatus that may be used to determine the relative emissivity of paper samples and/or insulating materials.

Thermal Emissivity Method #2 (by Illumination with an Incandescent Light Bulb):

FIG. 18 shows the test apparatus used to quickly visually compare the thermal emissivity of materials directly from the way that they absorb and then re-emit heat radiated from a hot-filament light bulb 83. Samples were mounted onto a shiny metal plate 82. Half of the sample was sprayed with mat black paint, and half was left exposed. All paint and adhesives used were allowed to dry at room temperature for at least 40 minutes. The camera 74 was switched on, and the spotlight was shone onto the samples from a low angle, so that stray heat radiation reflected away from the thermal camera 74. Immediately, black and high emissivity materials lit up in the thermal camera screen, as the absorbed heat and then re-emitted it back out in all directions—including towards the thermal camera 74.

Materials with low emissivity were generally much darker in color, after illumination for a few seconds.

Thermal Emissivity Method #3 Recommended by Flir Systems Inc.:

The following procedure was found it the Flir E40 manual, to give an actual emissivity number. Method #3 is as follows:

Step 1: Determine the reflected apparent temperature. This is needed to compensate for reflected ambient radiation sources, reflecting from your sample. Here are the steps:

i) Scrunch up a sheet of aluminum foil into a ball, and then uncrumple it.

ii) Attach this to a sheet of card of the same size.

iii) Put the cardboard in front of the object to me measured, with the foil pointing towards the camera 74.

iv) Set the internal camera emissivity setting to 1.0.

v) Record the apparent temperature of the aluminum foil

Step 2: Measuring the thermal emissivity:

vi) Adhere a strip of black electrical tape to the sample.

vii) Warm the sample up to at least 20° C. warmer than the ambient temperature.

viii) With the camera 74 pointing to the tape, change the emissivity setting to 0.97 and use one of the on-screen temperature measurement selection tools to measure the temperature of the tape.

ix) Move the temperature measurement tool to the sample surface without the tape. Now, change the internal emissivity setting until the measured temperature matches that of the insulating tape.

x) Record the emissivity of the sample.

Thermal Emissivity Test Method #4:

Thermal emissivity of certain samples was also tested by Thermophysical Properties Research Laboratory, Inc. of West Fayetteville Ind. using the following test methodology.

The Table Top Emissimetry apparatus measures total normal emissivity over a broad wavelength band. Thin, square samples, 0.5" on a side are mounted facing downward on an isothermal copper block heated by a resistance heater and surrounded by ceramic insulation. Five type-K thermocouples are mounted on the bottom face of the isothermal plate. Sample temperatures during emissivity measurements are inferred from the closest thermocouple. The samples are exposed to ambient air with convection losses minimized by the face-down orientation of the samples and the small gap to the detector head.

The IR detector is a broadband thermopile with a 1 mm diameter sensitive area and flat spectral response from 1-40 micrometers wavelength. The detector and radiation shield are water cooled and view the sample through a 3.56 mm aperture 5 mm from the sample surface. The detector is sensitive to radiation from an approximately 4.57 mm diameter spot on the sample. Stray radiation on the detector is minimized by a flat optical black coating on the inner surface of the shield and both faces of the aperture plate and by cooling the shield and aperture plates. The shield temperature is monitored by two type-K thermocouples embedded in the shield walls. Thermocouple and detector voltages are fed to an analog to digital module and attached to a personal computer. The emissivity E is calculated by the equation:

$$\epsilon = \frac{\epsilon_{shutter}(T^4_{shutter} - T^4_{shield}) + S\epsilon_{blkbody}(T^4_{blkbody} - T^4_{shield})}{(1+S)(T^4_{Sample} - T^4_{Sensor})}$$

where:

$$S = \frac{(V_{sensor} - V_{shutter})}{(V_{blkbody} - V_{sensor})}$$

and V is the detector voltage, T is the temperature measured in Kelvin. The subscripts are as follows:

$T_{shutter}$ is the temperature of the shutter.

$T_{shied}$ is the temperature of the infrared detector when the shutter is in place.

$T_{sensor}$ is the temperature of the infrared detector during measurements.

$T_{blackbody}$ is the temperature of the standard blackbody used to calculate the unknown values.

$T_{sample}$ is the temperature of the sample using the thermocouple nearest the sample.

$V_{shutter}$ is the voltage from the infrared detector when the shutter is in place.

$V_{blackbody}$ is the voltage from the two black body readings taken.

$V_{sensor}$ is the voltage of the infrared detector from each sample.

$\epsilon_{shutter}$ is the emissivity of the shutter at the temperature when read ($\epsilon = 0.09$)

$\epsilon_{blkbody}$ is the emissivity of the blackbody standard ($\epsilon$=0.95)

$\epsilon$ is the emissivity of sample.

In operation, power to the heater is adjusted by a computer controlled Eurotherm temperature controller to achieve a desired plate temperature and the system is allowed to stabilize. The detector is aligned with the sample to be viewed and its output voltage recorded. All samples on the isothermal plate are maintained in a constant radiation and convective heat transfer environment as the X-Y table is moved by the extended insulation block surrounding the detector head. Measurement of an oxidized copper reference standard with $\epsilon$=0.96±0.01 and a closed aperture measurement are made before and after each sample suite at each temperature. Total hemispherical emissivity is estimated from total normal/total hemispherical relationships developed for metals and insulators. The current temperature range covered is from room temperature to around 150° C.

Expanded Polystyrene Cooler Window Test Method #5

This test was devised to measure the amount of heat flowing through a given sample, as if it were placed in direct sunlight on a hot day. While a steady-state test would be ideal, the inventors sought methods to make rapid assessments of thermal properties for further research. While not wishing to be limited by theory, this test combines both emissivity (absorption of radiative heat) and conduction to give a measure of the amount of heat passing through a given sample.

Approximately 5 US gallons of Atlanta city water was placed into a 6-gallon bucket and sealed with a lid to equilibrate to room temperature for at least 24 hours. Expanded polystyrene coolers were purchased from Uline (Pleasant Prairie Wis.) (part number 521529) Inside dimensions: 8"×6"×7", wall thickness 1.5", and outside dimensions 11"×9"×10". A 100 mm diameter acrylic circular template was used to draw a circle on one of the 11"×9" faces of the cooler. The circle was positioned 60 mm from the top of the cooler, and 88 mm from either side, as shown in FIG. 43A-43B. The circle was carefully cut out using an electrically heated hot knife (e.g. RoMech Pro Hot Knife Kit 200W Styrofoam cutter, made in China).

Two-part liquid silicone compound was mixed and used to seal the inside of the insulated cooler by painting the inner surfaces. The silicone resin (for example, Diamond Driven Liquid Silicone Compound, available from Amazon.com, or Oomoo 30 Silicone Mold Making Rubber available from Amazon.com, or Smooth-On Ecoflex 00-35 fast platinum cure silicone rubber compound kit, available from Smooth-On through Amazon.com, or RTV Silicone Rubber for Mold Making available from Specialty Resin & Chemical LLC, Dowagiac Mich., or similar) was allowed to cure overnight. The following day, excess silicone resin was cut from the exterior of the cooler in the vicinity of the cut circular hole, to ensure bondability between the expanded polystyrene and the sample. Although silicone resins were used, it was also found that epoxy resins could alternately be used to waterproof seal coolers without destroying the expanded polystyrene structure.

Sample preparation: Coatings were made onto 35 lb per 1000 sq ft (35 MSQ or 170 gsm) kraft board using meyer rods and dried. Example board is available from Juvo Plus Inc. (Irwindale Calif.) in the form of "200 pack kraft laser and ink jet printer post cards 2 up per page" SKU LJ-WA-CHG-031218-11-1. This paper was selected as it proved to be a more consistent source of kraft fiberboard than obtaining samples of 35 lb MSQ liner board from various corrugated board manufacturers. In some tests, the kraft fiberboard was substituted with a sheet of paper containing fillers, or thermal insulation elements or other materials that the inventors wished to assess, such as metallized bubble wrap.

Aluminum foil (e.g. Glad® Heavy Duty Aluminum Foil, distributed by Phoenix Industries Inc Denver Colo., and available in grocery stores) was cut into sheets which were sprayed black on the dull side, using matt black spray paint (e.g. Rust-Oleum® Painter's Touch 2× Ultracover Paint+ Primer, Rust-Oleum Corporation, Vernon Hills Ill.) and allowed to dry. The acrylic 100 mm diameter template was then used to mark and cut circular samples of coated kraft board. The back (kraft paper) sides of these were then sprayed with an adhesive such as 3M® Super 77™ Multipurpose Adhesive, made by 3M Company (Minneapolis Minn.) and sold in many craft, office, and hardware stores. The discs were carefully bonded to the shiny side of the painted foil, and placed between paper sheets under several books (about 1 kg pressure) until dry, to maintain flatness of the sample. The foil sheet was trimmed so that approximately 0.5" to 1" of shiny foil remained surrounded each sample.

3M® Marine Adhesive Sealant Fast Cure 4000 UV (part #05280) was then used to carefully adhere the black surface of the foil-sample composite to the outside of the cooler, so that the sample was in line with the opening into the cooler. Other sealants could be used provided that they bond to both painted foil and expanded polystyrene, do not destroy expanded polystyrene by partially dissolving it, and that they form a waterproof seal. This was then allowed to cure overnight.

Figure 19A:
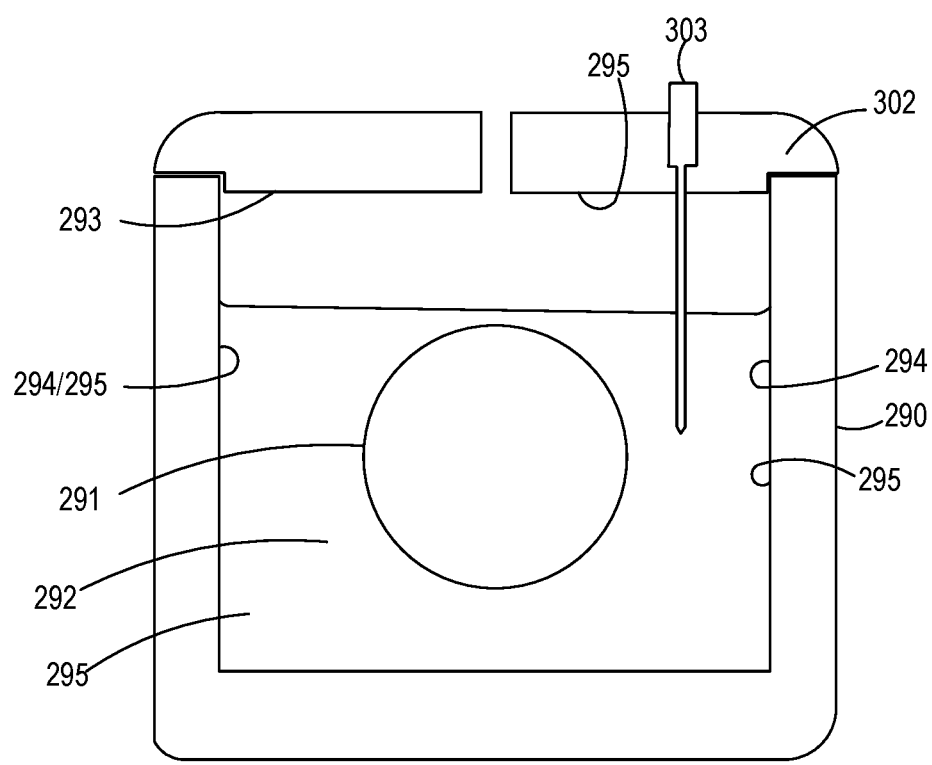
FIGS. 19A and 19B depict views of an apparatus that may be used to determine the rate of heat transfer of paper samples and/or insulating materials with FIG. 19A depicts a cut-away view of modifications to an expanded polystyrene cooler including dimensions, as well as positioning of the window through the cooler wall.
Figure 19B:
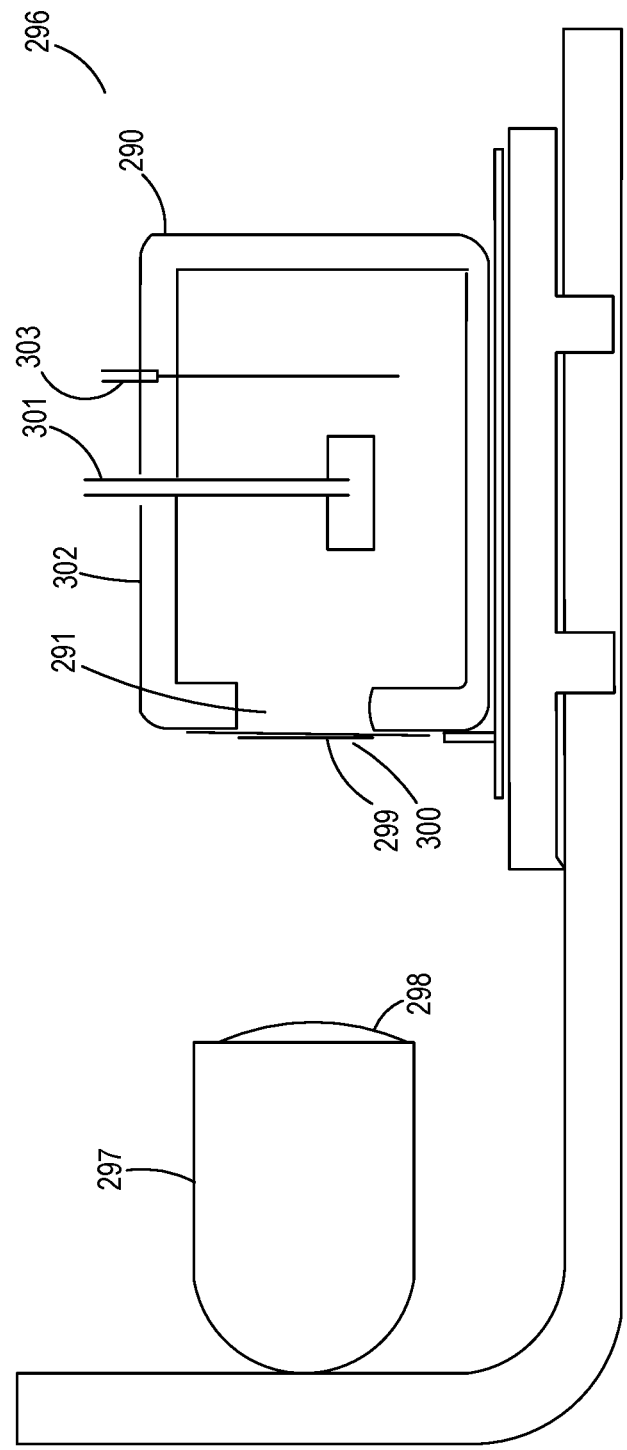

The cooler with the sample window was placed on the test rig built and illustrated in FIGS. 19A-19B. The test rig allows the repeatable location of the test window in front of the 110V 250 W tungsten filament heat lamp such as those used in restaurants to keep prepared food hot prior to serving (e.g. Intertek 5000707, white incandescent tungsten heat lamp). The test rig shown in FIGS. 19A-19B includes adjustment of angle of incidence and distance from the surface of the lamp to the center of the test material. 4,500 g of water that had been allowed to equilibrate to room temperature was weighed to the nearest gram (using a Philips® Essence kitchen electronic top pan scale 1 g increments to 5 kg capacity) and poured into the cooler. The stirrer blade was inserted through the lid, and a digital thermometer probe was also inserted through the lid. A strobe light was used to time the rotation of the stir blade to 600 rpm.

The water was stirred for several minutes until the temperature stabilized, at which time it was recorded. A timer was set for 15 minutes. The heat lamp was switched on, and the timer started simultaneously. The temperature of the water in the cooler was recorded every 15 minutes for one hour.

All tests were conducted in an air-conditioned temperature-controlled environment with an air temperature between 68° F. and 71° F. Positive control sample was a kraft disk that also had a layer of aluminum foil laminated to it before adhering it to the shiny side of black painted foil, and a negative control consisted of an uncoated kraft disk mounted onto a similar foil sheet.

The temperature rise (DT) over one hour was used to determine the amount of energy (Joules) flowing through the coated kraft board per unit time (Watts) using the equation:

$$E \text{ (Joules)} = 4.2 * DT * 4500$$

where 4.2 is the specific heat capacity of water in $J \cdot K^{-1} \cdot g^{-1}$; and 4500 is the mass of the water present in the container.

Rate of energy transfer into the water Watts (ER) through the window is calculated by dividing by the number of seconds in one hour, viz.:

$$ER=E/3600 \text{ Watts}$$

As the surface area of the disc is known, then the energy flux Watts per square meter can also be calculated ($W \cdot m^{-2}$)

In some experiments, an infrared thermometer (Etekcity Lasergrip 1025D) was also used to measure the outside temperature of the disk, to give an approximation of the temperature difference over the thickness of the sample.

% Ash Content:

These tests were carried out by SGS Integrated Paper Services Inc., Appleton Wis. according to TAPPI T 211 om-16 Ash in wood, pulp, paper and paperboard: combustion at 525° C. Approximately 10.0 g of paper was accurately weighed, and then ashed in a muffle furnace at 525° C. The remaining ash was then re-weighed to determine ash content.

% Moisture:

These tests were carried out by SGS Integrated Paper Services Inc., Appleton Wis. according to TAPPI T 550 om-13 Determination of equilibrium moisture in pulp, paper and paperboard.

Repulpability:

Repulpability was tested by SGS Integrated Paper Services Inc., Appleton Wis. according to the "Voluntary Standard for Repulping and Recycling Corrugated Fiberboard treated to Improve its Performance in the Presence of Water and Water Vapor Protocol of 2013", generated by the Fiber Box Association, headquartered in Elk Grove Village, Ill., 60007. Repulpable means the test material that can undergo the operation of re-wetting and fiberizing for subsequent sheet formation, using the process defined in this standard. In the repulpability test, materials are weighed, pulped in a specific manner using laboratory equipment, run through a laboratory disintegrator, and then run through a screen. The amount of rejected material is compared to the material that could be reused as pulp to make board as a % by mass. Two figures are derived: The first is the acceptable recovery of the fiber based upon the mass of material first entered into the test, and the second is the percentage of the recovered fiber that is accepted, not rejected. These figures constitute the "% re-pulpability", and the fiber box association has determined that a pass for both measures of repulpability is >85%. Other parameters recorded are: a) material fouling the equipment during pulping or forming b) material that does not disintegrate and has to be removed (becomes part of the rejects)

Coating Method:

A clip attached to a ¾" thick glass plate is used to hold a stack of photocopy paper and the sheet of paper to be coated. A strip of masking tape was placed along the top of the sheet to be coated, and a paper towel was left hanging off the end. A transfer pipette was used to make a line of coating on the masking tape. This prevented the coating from prematurely soaking into the paper board to be coated. Meyer rods (available from RD Specialties Inc.) were used to draw the coating down over the sheet. The coating was then dried under ambient conditions.

Wetting Out and Stabilization:

Before materials can be included in a coating or into the fibrous matrix of paper, materials first have to be wetted out and dispersed. Some materials such as glass have high enough surface free energy that the wet out spontaneously—whereas materials such as perlite and aerogel require surfactants to lower the surface free energy of the water enough to wet out the material.

Surfactants may be non-ionic, cationic, or anionic. They may be high molecular weight polymers or copolymers, or they may be low molecular weight, and able to reach newly created interfaces rapidly. Surfactants for aqueous systems may be characterized by their HLB value. HLB stands for Hydrophilic-Lipophilic Balance, and is a measure of the capability of the particular surfactant to wet out various surfaces of differing surface free energy. Very hydrophobic materials have a low surface free energy, so a matching surfactant should also have a low HLB value. More hydrophilic surfaces—those with multiple polar groups perhaps, require surfactants with higher HLB values.

Microspersion EZ manufactured by Micropowders Inc. of Tarrytown N.J. is a non-ionic low molecular weight surfactant with a low HLB. Dawn® liquid dish soap, manufactured by the Procter & Gamble Co (Cincinnati Ohio) is an example of a low molecular weight anionic surfactant. E-Sperse 100 (from Ethos, Greenville S.C.), Triton BG-10 (Dow) Glucopon 425 N (BASF) and Glucopon 215 UP (BASF) are additional materials that can wet out certain hydrophobic materials. The Surfynol range available from Evonik are ethoxylated acetylenic diols of fairly low molecular weight. They are non-ionic, and low foaming due to the molecular interactions of the acetylenic moiety with the water surface. Surfynol 104, 440, 420 are representative examples.

Higher molecular weight materials are useful for stabilizing dispersions of various materials in water. Polymers may be anionic, cationic, or non-ionic—or have a mixture of characteristics. Polymeric dispersants, also known as "grid aids" are often co-polymeric in nature, for instance some of the Joncryl resins from BASF are believed to be methacrylic acid—styrene—butylmethacrylate copolymers, containing anionic ionizable groups. Zetasperse 3100, Zetasperse 3800, TegoDispers 752W, and TegoDispers 755W are also higher molecular weight dispersing agents with a net negative formal charge when ionized available from Evonik. Disperbyk 190, as well as other Disperbyk products available from BYK Chemie (Wallingford Conn.) are also polymeric/copolymeric materials that help stabilize dispersions through a) increasing particle surface negative charge (electrokinetic stabilization), and b) by allowing steric stabilization by dint of segments of polymer dissolving into the continuous medium.

Low Emissivity Insulative Clay Coatings:

Many corrugated cardboard boxes and fiberboard packages are coated with a clay coating. This coating provides a smooth flat ink-receptive surface that allows high quality printing, it covers the brown color of unbleached pulp with white, and gives the packaging a higher quality feel. Often the coating is applied in two layers. The first layer is kaolin clay based, whitened by calcium carbonate. This layer helps smooth the surface by filling in low spots. The second layer also contains titanium dioxide and calcium carbonate. The formulations of clay coatings vary. Usually, they contain kaolin clay, along with a film forming binder, such as an acrylic latex, or sometimes a cornstarch. A polymeric dispersant is usually included to stabilize the clay coating, and a viscosity control agent is usually also included, such as carboxymethyl cellulose, or an hydrophobically associated alkali swellable polymer (HASE polymer.) Calcium carbonate is also usually included, along with titanium dioxide pigment for whitening. The clay coating offers another opportunity to incorporate insulative elements that reduce conduction and radiative heat transfer.

Emissivity Screening Results of Materials—Conductivity Method #1:

Powdered materials were sampled and tested to observe emissivity differences through a thermal camera. The emissivity of the powder surface and the powder surface sprayed with black paint were compared. NVD=no visible difference.

| Material | Comment after 2 minutes of heating |
|---|---|
| Aerogel IC 3120 powder | Possible lower emissivity |
| Perlite P-32 75 micron (cenosphere) | NVD |
| Thermacel powder | Possible lower emissivity |
| Hi Refractive Index glass beads 60μ | Possible lower emissivity |
| Hi Refr. Index glass beads 35μ-45μ | NVD |
| Hi Refr. Index glass beads 180μ-600μ | NVD |
| Titanium dioxide powder | Lower |
| Zinc oxide powder | NVD |
| Yellow oxide pigment (iron oxide) | NVD |
| Bismuth oxychloride powder | Lower |
| Party pink mica powder | NVD |
| Super pearly white mica powder | NVD |
| Snowflake sparkle mica powder | Lower |
| Queens purple mica powder | NVD |
| Diatomaceous Earth powder | NVD |
| Mica Sheet | Lower |
| Kaolin Clay powder | NVD |
| Silicon powder | Lower |
| Kaolin Coating - 42-02 | Lower (slight) |
| Diatomaceous earth coating 43-01 | Lower (slight) |

These powder sample data gave us several ideas for follow up tests. Curiously, some of the materials gave different results if they are first formulated into a coating (e.g. kaolin and diatomaceous earth). In other cases, low thermal conductivity may have skewed some readings.

Emissivity Screening Results of Materials—Illumination Method #2:

Both powdered materials, as well as materials incorporated into coatings coated onto fiberboard were sampled and tested to observe emissivity differences through a thermal camera. The emissivity of the powder surface/coating surface and regular Cardboard were compared when illuminated by an incandescent tungsten spot light. NVD=no visible difference in emissivity vs. cardboard. Coating formulas follow below. NT=not tested

| Material | Comment 4 seconds of illumination |
|---|---|
| Aerogel IC 3120 powder | NVD |
| Silicon powder | NVD |
| Snowflake Sparkle Mica | Lower |
| Pewter Silver mica | NVD |
| Hi RI glass beads 60μ Al coated | NVD |
| Hi Refr. Index glass beads 35μ-45μ | Slightly lower |
| Thermacels | NVD |
| Titanium dioxide | Lower |
| Zinc oxide | Lower |
| Mica Sheet | Much Lower |
| Bismuth oxychloride powder | Much Lower |
| Perlite P-32 (75μ) | NVD |
| 30-03, Meyer #130 (25% glass bubbles) | Slightly lower |
| 22-02, Meyer#130, (24% Aerogel in starch) | Lower |
| 19-01, Meyer#130, (37% Perlite in starch) | Much Lower |
| 19-01, Meyer #40, (37% Perlite in starch) | Lower |
| Kaolin Powder | Slightly Lower |
| Kaolin Coating - 42-02 Meyer #40 | Much Lower |
| Diatomaceous Earth powder | Lower |
| Diatomaceous earth coating 43-01 | NVD |
| Aerogel Coating 38-02 (~50% aerogel) | Much Lower |
| Bismuth Vanadate | Much Lower |
| BiLite 20 | Much Lower |
| Gypsum | Lower |
| Sericite Pigment | Lower |
| Aluminum Oxide Powder | Lower |

These data gave us additional ideas to pursue insulating against thermal radiative emission and absorption, in addition to insulating against thermal conduction.

Additional Material Sources:

Glass beads, including high refractive index glass, and retroreflective hemi-spherically mirrored glass beads—Cole Safety Products, Glass microbubbles—3M specialty materials, iM30K Bismuth oxychloride—Making Cosmetics Inc (Redmond Wash.). This is a pearlescent pigment, commonly used in cosmetics and packaging to impart a pearl effect. Other sources include BASF, as Biju Ultra UFC and Pearl Glo.

BiLite 20 powder—BiOCl coated onto mica flakes (BASF)

Bismuth Vanadate—Dominion Colour, Ontario

Titanium Dioxide—Brambleberry (Bellingham, Wash.)

Zinc Oxide—Brambleberry (Bellingham, Wash.), and Sky Organics

Snowflake Sparkle Mica—Brambleberry (Bellingham, Wash.)

Super Pearly White Mica—Brambleberry (Bellingham, Wash.)

Pewter Mica—Brambleberry (Bellingham, Wash.)

Party Pink Mica—Brambleberry (Bellingham, Wash.)

Queens Purple Mica—Brambleberry (Bellingham, Wash.)

Yellow iron oxide powder—Brambleberry (Bellingham, Wash.)

Thermacels—HyTech Thermal Solutions, Melbourne Fla. This material is an additive that is advertised to be mixed into paint in order to increase the paint's insulating properties.

Rhoplex VSR-50 is an acrylic low VOC film forming binder emulsion in water. Commonly used in architectural coatings. Originally sold by Rohm & Haas, now available from Dow Chemical.

Sericite comprised sericite mica surface treated with magnesium myristate or Sericite White sparkle luxury mica colorant pigment powder by H&B Oils Center Co.

Supertherm paint, from Eagle Specialty Coatings, British Columbia, Canada

Coatings to Test for Emissivity on Fiberboard or Card

| Formulation ID | Materials | Quantity/g |
|---|---|---|
| JL 48-01 | CaCO₃ | 50.00 |
| | Water | 50.00 |
| | 10% Rhoplex VSR-50 in water | 20.00 |
| JL 48-02 | Kaolin Clay | 50.00 |
| | Water | 70.00 |
| | 10% Rhoplex VSR-50 | 20.00 |

| Formulation ID | Materials | Quantity/g |
| --- | --- | --- |
| JL 48-03 | Bismuth Oxychloride | 20.13 |
|  | water | 33.55 |
|  | 10% Rhoplex VSR-50 in water | 8.05 |
| HT 50-01 | Eagle Specialized Coating |  |

Low Emissivity Coatings on Fiberboard—Cooler Window Tests

Based upon the rapid testing using Emissivity tests 1 & 2, several materials were selected for further investigation. In preparation for printing, fiberboard is often coated with a clay coating, which smooths the surface and gives it a white color. A simple clay coat formulation was generated: Kaolin Clay Coating 127-01:

| Material | Quantity (g) |  |
| --- | --- | --- |
| Water | 130 |  |
| Tego Dispers 755W | 4.86 | Evonik |
| Rovene 6400 | 52.89 | Mallard Creek Polymers |
| Hydrite SB60 | 157.8 | Imerys |

Low Emissivity Coating Formulations by % Composition

| % | TS110 | 137-02 | TS111 | TS112 | TS113 | 137-06 | 127-02 | 137-04 | 137-05 | 136-01 |
| --- | --- | --- | --- | --- | --- | --- | --- | --- | --- | --- |
| Water | 62.5 | 68.15 | 64.28 | 65.51 | 65.51 | 65.51 | 65.51 | 17.5 | 30.48 | 65.55 |
| T-755W | 8.18 | 2.5 | 5.01 | 5.10 | 5.10 | 5.1 | 5.1 |  |  | 5.1 |
| R-6090 | 2.75 |  |  |  |  |  |  |  |  |  |
| R-4100 |  | 2.85 | 2.71 | 2.85 | 2.85 | 2.85 | 2.85 | 2.85 | 2.85 | 2.85 |
| HPMC |  |  | 1.96 |  |  |  |  |  |  |  |
| BiOCl | 26.56 |  |  |  |  |  |  |  |  |  |
| BiLite |  | 26.5 |  |  |  |  |  |  |  |  |
| ZnO |  |  | 26.04 |  |  |  |  |  |  |  |
| ZnS |  |  |  | 26.54 |  |  |  |  |  |  |
| MgO |  |  |  |  | 26.54 |  |  |  |  |  |
| TiO$_2$ |  |  |  |  |  | 26.5 |  |  |  |  |
| Al-ZnO |  |  |  |  |  |  | 26.54 |  |  |  |
| TH1000 |  |  |  |  |  |  |  | 80 |  |  |
| TH500EF |  |  |  |  |  |  |  |  | 66.67 |  |
| Ag-Glass bubbles |  |  |  |  |  |  |  |  |  | 26.5 |

ZnO—Sky Organics

T-755W—a slightly anionic, polymeric high performance wetting and dispersing additive commercially available under tradename TEGO® Dispers 755 W (Evonik (Allenton, Pa.))

R-6090—all acrylic emulsion commercially available under tradename Rovene® 6090 (Mallard Creek Polymers (Charlotte, N.C.))

R-4100 denotes Rovene 4100 (Mallard Creek Polymers, N.C.) is a carboxylated styrene-butadiene copolymer emulsion with a polymer Tg around −5° C., so no post-dry heating is required to form a film. The product contains around 50% solids, and the emulsion has a pH of around 6.

R-6090 denotes Rovene 6090 (Mallard Creek Polymers, N.C.) is a modified vinylacetate copolymer emulsion with a polymer Tg of 39° C. This binder has release properties, allowing adhesive materials to be peeled from the coating surface.

HPMC—3% aq solution of hydroxypropyl methyl cellulose.

BiOCl—Bismuth oxychloride, sold as Pearl Glo (BASF)

Al—ZnO—Aluminum-doped zinc oxide particles, AZO 100, 20-40 nm particle size, available from Oocap Inc. Las Crusas N. Mex.

TH500 EF is Ropaque™ TH500EF from Dow Chemical hollow polymeric microsphere pigment of approximate size 0.4 micron diameter, and 30% solids.

TH1000 is Ropaque™ TH1000 from Dow Chemical hollow polymeric microsphere pigment of approximate size 1 micron diameter, and 26.5% solids Silver (Ag)-coated glass bubbles, available from CoSpheric LLC.

Conductive silver metal coated hollow glass microspheres 5-30 microns, density 0.75 g/cm$^3$, product ID: M-18-Ag-0.75

Kaolin clay coating 127-01 was coated onto 170 gsm (35 lbs/1000 sq ft) kraft laser & ink jet printer post cards, available from Juvo Plus Inc Irwinsdale Calif., using a #5 Meyer rod and dried in a hot air oven at 250° F. for 5 mins. Various coatings were selected and coated onto the board, drying the coatings between each application. A representative area was selected, and tested on the test rig illustrated in FIG. 19A-19B. The distance to the lamp was set to 4.5", 4500 grams of water were weighed into the cooler, and the stirrer rotation was set to 600 rpm. The water temperature rise over 1 hour of lamp exposure was recorded.

| Exp: | Al foil | none | 1 clay | 2 clay | 3 clay | BiOCl | BiLite | MgO |
| --- | --- | --- | --- | --- | --- | --- | --- | --- |
| Base: | Kraft | Kraft | Kraft | Kraft | Kraft | Kraft | Kraft | Kraft |
| Coat 1 | Al foil | — | 127-01 | 127-01 | 127-01 | 127-01 | 127-01 | 127-01 |
| Coat 2 | — | — | — | 127-01 | 127-01 | TS110 | 137-02 | TS113 |
| Coat 3 | — | — | — | — | 127-01 | — | — | — |
| Temp Rise/° C. | 1.3 | 4.1 | 3.7 | 3.5 | 3.5 | 3.4 | 3.1 | 3.5 |
| W · m$^{-2}$ | 87 | 274 | 247 | 234 | 234 | 227 | 207 | 234 |

Al foil: Aluminum foil (Reynolds heavy duty kitchen foil) was mounted dull face down to Juvo kraft paper using 3M spray adhesive.

| Exp: | ZnO | ZnS | TiO₂ | Al•ZnO | AgGls* | TH1000 | TH500EF | TiO₂ on Foil |
|---|---|---|---|---|---|---|---|---|
| Base: | Kraft | Kraft | Kraft | Kraft | Kraft | Kraft | Kraft | Kraft |
| Coat 1 | 127-01 | 127-01 | 127-01 | 127-01 | 127-01 | 127-01 | 127-01 | Foil |
| Coat 2 | TS111 | TS112 | 137-06 | 127-02 | 136-01 | 137-05 | 137-04 | 137-06 |
| Coat 3 | — | — | — | — | — | — | — | — |
| Temp Rise/° C. | 3.2 | 3.3 | 3.5 | 5.1 | 3.1 | 3.7 | 3.3 | 2.9 |
| W·m⁻² | 214 | 221 | 234 | 341 | 207 | 247 | 221 | 194 |

*Ag-coated glass bubbles available from CoSpheric LLC. Conductive silver metal coated hollow glass microspheres 5-30 microns, density 0.75 g/cm³, product ID: M-18-Ag-0.75

| Exp: | BiLite | ZnO | BiOCl | ZnO/BiLite | BiLite/ZnO |
|---|---|---|---|---|---|
| Base: | Kraft | Kraft | Kraft | Kraft | Kraft |
| Coat 1 | 127-01 | 127-01 | 127-01 | 127-02 | 127-02 |
| Coat 2 | 127-01 | 127-01 | 127-01 | TS111 | 137-02 |
| Coat 3 | 137-02 | TS111 | TS110 | 137-02 | TS111 |
| Temp Rise/° C. | 3.2 | 3.1 | 3.3 | 3 | 3.1 |
| W·m⁻² | 214 | 207 | 221 | 201 | 207 |

These data suggest that we can reduce the amount of energy absorbed by a box, or emitted from the inside surfaces of a box using coatings, by around 30%. While aluminum foil, as well as aluminized bubble wrap are very effective, they can cause problems if introduced into the repulping stream, and in any case are challenging to recycle. Not only could many of these coatings be applied to the interior and or exterior of the box, but could also be used as separate sheets of packaging, as illustrated as the loose sheets in FIG. 13A-13B.

Results of Emissivity Testing by Test Method #4:

| Exp: | Contrl | 1 clay | 2 clay | 3 clay | TiO₂ | ZnS | AgGls* | ZnO |
|---|---|---|---|---|---|---|---|---|
| Base: | Kraft | Kraft | Kraft | Kraft | Kraft | Kraft | Kraft | Kraft |
| Coat 1 | — | 127-01 | 127-01 | 127-01 | 127-01 | 127-01 | 127-01 | 127-01 |
| Coat 2 | — | — | 127-01 | 127-01 | 137-06 | TS112 | 136-01 | TS111 |
| Coat 3 | — | — | — | 127-01 | — | — | — | — |
| ε @ 23° C. | 0.900 | 0.859 | 0.883 | | 0.885 | 0.869 | 0.519 | 0.888 |
| ε @ 30° C. | 0.909 | 0.866 | 0.894 | | 0.895 | 0.873 | 0.530 | 0.918 |
| ε @ 40° C. | 0.915 | 0.866 | 0.894 | | 0.904 | 0.874 | 0.536 | 0.933 |

*Ag-coated glass bubbles, available from CoSpheric LLC. Conductive silver metal coated hollow glass microspheres 5-30 microns, density 0.75 g/cm³, product ID: M-18-Ag-0.75

| Exp: | BiLite | BiLite | ZnO | BiOCl | ZnO/BiLite | BiLite/ZnO |
|---|---|---|---|---|---|---|
| Base: | Kraft | Kraft | Kraft | Kraft | Kraft | Kraft |
| Coat 1 | 127-01 | 127-01 | 127-01 | 127-01 | 127-02 | 127-02 |
| Coat 2 | 137-02 | 127-01 | 127-01 | 127-01 | TS111 | 137-02 |
| Coat 3 | — | 137-02 | TS111 | TS110 | 137-02 | TS111 |
| ε @ 23° C. | 0.856 | 0.873 | 0.885 | 0.861 | 0.848 | 0.868 |
| ε @ 30° C. | 0.873 | 0.875 | 0.897 | 0.876 | 0.860 | 0.877 |
| ε @ 40° C. | 0.882 | 0.871 | 0.902 | 0.881 | 0.856 | 0.881 |

Discussion of Emissivity Vs. Heat Transfer Results

The inventors were surprised by the results of their own emissivity tests methods 1 and 2, as well as the emissivity results provided by the outside laboratory (Thermal Emissivity Test Method #4). Several coatings have been discovered by the inventors that apparently reduce the transfer of radiant heat energy from an incandescent light bulb (as a proxy to the full-sun illumination of a delivered package) through sheets of paper. The inventors were surprised to find that the emissivity results from the third-party laboratory did not correlate with the heat transfer through the materials measured by the cooler window tests. Clearly, the inventors may have discovered several coatings with non-obvious and unexpected thermal properties.

| Sample | Emissivity at 23° C. | Thermal Conduction/ W·m⁻² |
|---|---|---|
| Clay + ZnO + BiLite | 0.848 | 201 |
| Ag-coated glass | 0.519 | 207 |
| Clay + BiLite + ZnO | 0.868 | 207 |
| Clay + Clay + ZnO | 0.885 | 207 |
| Clay + BiLite | NT | 207 |
| Clay + Clay + BiLite | 0.861 | 214 |
| Clay + ZnO | 0.888 | 214 |
| Clay + ZnS | 0.869 | 221 |
| Clay + Clay + BiOCl | 0.861 | 221 |
| Clay + TiO₂ | 0.885 | 234 |
| Clay + Clay | 0.883 | 234 |
| Clay | 0.859 | 237 |
| Kraft | 0.900 | 274 |

Example 3. Sheets Containing Insulating Elements

Approximately 5.35 g portions of 35 lb liner board (International Paper) was shredded and repulped. Additional materials were added, along with surfactants if necessary for wetting. While not yet optimum formulations, we had found that we could make paper sheets containing insulating elements by adding surfactant, along with a cationic polysaccharide, such as cationic Guar Gum, available from Making Cosmetics Inc., or a cationic starch sizing, or a synthetic retention aid, such as Polymin P (BASF), also known as poly(ethylene imine), or a high molecular weight poly(acrylamide) available from various sources. Hydrophobically associating polymers may also be incorporated, such as N-alkyl poly(acrylamides.) We wished to understand the amount of retained insulation in the paper following drying.

The following formulations were made up and cast as paper, dried at room temperature and then sent for ash content and moisture content analysis:

| Formulation ID | Materials | Mass/g | Target % By mass | % Moisture paper | % Ash Paper |
|---|---|---|---|---|---|
| JL 24-02 Control | Water | 800.00 | 0% | 8.4% | 0.84% |
| | Pulp | 5.35 | | | |
| JL 23-01 | Water | 800.00 | 25% | 6.2% | 15.9% |
| | Pulp | 5.35 | | | |
| | Microspersion EZ (neat) | 2.00 | | | |
| | Perlite P-50 (20 micron) | 1.78 | | | |
| | Cationic Guar Gum | 0.80 | | | |
| JL 23-02 | Water | 800.00 | 50% | 7.2% | 28.5% |
| | Pulp | 5.35 | | | |
| | Microspersion EZ (neat) | 2.00 | | | |
| | Perlite P-50 (20 micron) | 5.35 | | | |
| | Cationic Guar Gum | 0.80 | | | |
| JL 24-01 | Water | 800.00 | 50% | 6.7% | 22.9% |
| | Pulp | 5.35 | | | |
| | Microspersion EZ (neat) | 2.00 | | | |
| | Perlite P-50 (20 micron) | 5.35 | | | |
| | Cationic Guar Gum | 2.00 | | | |
| JL 25-02 | | 800.00 | 25% | 8.0% | 8.8% |
| | Pulp | 5.35 | | | |
| | Microspersion EZ (neat) | 2.50 | | | |
| | Perlite P-50 (20 micron) | 1.78 | | | |
| pH = 8-9 | Polymin P | 0.80 | | | |
| JL 26-01 | Water | 800.00 | 50% | 7.3% | 16.8% |
| | Pulp | 5.35 | | | |
| | Microspersion EZ (neat) | 2.00 | | | |
| pH = 6.0 | Perlite P-50 (20 micron) | 5.35 | | | |
| JL 32-01 | Water | 800.00 | 25% | 7.5% | 14.7% |
| | Pulp | 5.35 | | | |
| | 3M Glass Bubbles | 1.78 | | | |
| | 0.5% a.q. Cationic Guar Gum | 10.00 | | | |
| JL 32-02 | Water | 800.00 | 50% | 6.8% | 28.5% |
| | Pulp | 5.35 | | | |
| | 3M Glass Bubbles iM30K | 5.35 | | | |
| | 0.5% a.q. Cationic Guar Gum | 10.00 | | | |

A mass balance was performed to confirm that a portion of the perlite and a portion of the finer was lost during the drawing and pressing process.

Repulpability Tests: Insulated Paper Vs. Uline Insulated Cardboard Box 90 lb fiberboard was fed through a paper shredder. 5.35 g was weighed and pulped in hot water as usual. The pulp was more dense and more difficult to disperse than the pulp from the 35 lb paper. Paper sheets were made using the following formulations:

| JL 41-01 | water | 800.00 |
| | Pulp - 90# shredded paper | 12.50 |
| | iM30K glass bubbles | 12.50 |
| | 0.5% cationic guar gum solution | 25.00 |

-continued

| JL 41-02 | water | 800.00 |
| | Pulp - 90# shredded paper | 12.50 |
| | Microspersion EZ (neat) | 1.60 |
| | Perlite P-50 | 12.50 |
| | 0.5% cationic guar gum solution | 25.00 |

As a control (IL 44-01), the existing method of shipping cold objects was also tested for repulpability. Corrugated cardboard from a BS121007 single walled 12"×10"×17" box sections were laminated to an insulated box liner, made from 3/16" cool-shield bubble & metallized film, available from Uline as model number S-15223. The materials were laminated using 3M aerosol spray adhesive.

| Designation | Summary | Yield based upon total fiber collected. (% accepts) Av. of 2 | Yield based upon original charge to the pulper (% accepts) Av. of 2 | Operational impact (Pass/Fail) |
|---|---|---|---|---|
| 44-01 | Control | 64.7% | 56.4% | Fail |
| 41-01 | 50% iM30K | 98% | 70% | Pass |
| 41-02 | 50% perlite P-50 | 93% | 66.9% | Pass |

These data illustrate the validity that the approach of incorporating insulating elements into the paper structure has the potential to produce a repulpable thermally insulating material for packaging.

Example 4. Additional Sheets Made for Moisture, Ash Content, and Repulpability 35 lbs per 1000 sq. ft. single-ply sheets containing additives were made for additional repulpability tests, consistent with the Fiberboard Association voluntary standard for repulpability. Sheets FA, FD, FE, FF, FG were made using Grade 100 bleached pulp secondary fiber (supplied by Donco Recycling Solutions with offices in Chicago Ill.) The target basis weight for each sheet was 35 lbs per 1000 square feet (MSQ). Taking sample FD as an example, to make 35 MSQ board with 50% additive, 17.5 lbs of dry pulp is mixed with 17.5 lbs of additive for every 1,000 square feet of paper. Once ash content and moisture were measured, the sheets were then run through the repulping test in duplicate:

Sample Details, Moisture, and Ash Content:

| | | | Test Results | | | |
|---|---|---|---|---|---|---|
| Sample Details | | Measured % | | Based upon Dried Material | | |
| ID | Additive | % Additive | Moisture Content | % Fiber | % Ash | % additive retention |
| FA | (control) | 0 | 8.4 | 98.7 | 1.4 | N/A |
| FD | 20μ spherical perlite | 50 | 5.4 | 56.9 | 43.1 | 86.1 |
| FE | iM30k glass bubbles | 50 | 5.1 | 54.5 | 45.5 | 90.9 |
| FF | Dicalite LD 1006 | 50 | 5.0 | 52.6 | 47.4 | 94.7 |
| FG | 75μ spherical perlite | 50 | 6.2 | 62.1 | 37.9 | 75.7 |

Repulpability Test Data:

| ID | Initial Charge/g | Repulped Mass/g | Total Repulped mass accepted/g | Total Repulped mass Rejected/g | Total Fines/g |
|---|---|---|---|---|---|
| FA | 25.20 | 21.06 | 21.06 | 0.000 | 4.14 |
| FA | 21.60 | 17.62 | 17.62 | 0.000 | 3.98 |
| FD | 25.20 | 14.21 | 13.87 | 0.251 | 11.08 |
| FD | 25.10 | 14.81 | 14.80 | 0.008 | 10.29 |
| FE | 25.70 | 12.09 | 12.09 | 0.000 | 13.61 |
| FE | 25.40 | 12.74 | 12.74 | 0.000 | 12.66 |
| FF | 25.10 | 14.64 | 14.64 | 0.004 | 10.46 |
| FF | 25.60 | 15.98 | 15.24 | 0.036 | 10.32 |

Repulpability Test Results Analysis—Taking Ash Content into Account:

| ID | % Accepts based upon total fiber collected | % Accepts based upon initial charge | % accepts based on the amount of fiber present in the initial charge (additive ash excluded) | Deposition on equipment noted: |
|---|---|---|---|---|
| FA | 100.0 | 83.6 | 84.0 | No |
| FA | 100.0 | 81.6 | 82.1 | No |
| FD | 98.2 | 55.0 | 85.8 | No |
| FD | 99.9 | 59.0 | 89.6 | No |
| FE | 100.0 | 47.0 | 75.2 | No |
| FE | 100.0 | 50.2 | 80.0 | No |
| FF | 100.0 | 58.3 | 84.3 | No |
| FF | 99.8 | 59.5 | 91.9 | No |

Example 6. Corrugated Samples of 3-Ply Paper Sheets

An antique desk-top hand cranked corrugator was purchased. The corrugator indicated U.S. Reexam Pat. No. RE009,127 "Fluting-Machine", re-issued Mar. 23, 1880 to H. Albrecht.

A sheet of TL1 was hung from inside an inverted 5-gallon pail and held over a boiling tea kettle to steam the sheet. The cast iron hand-cranked corrugator was warmed with a hair dryer, and the warm steamed sheet was promptly rippled. This was promptly bonded between two non-corrugated sheets of TL1 to make a rudimentary corrugated structure. Single ply filled sheets were hand pressed in the lab and dried:

| Sheet Composition ID | EJ | EK |
|---|---|---|
| Water/g | 800 | 800 |
| Pulp/g | 4.5 | 4.5 |
| Flaked Perlite LD1006/g | 9.0 | |
| iM30K glass bubbles/g | | 9.0 |
| Household ammonia/g | | 2-4 |

A sheet of EJ was hung from inside an inverted 5-gallon pail and held over a boiling tea kettle to steam the sheet. The cast iron hand-cranked corrugator was warmed with a hair dryer, and the warm steamed sheet was promptly fluted. This was promptly bonded between two non-corrugated sheets of EJ to make a rudimentary corrugated structure. This procedure was repeated using EK sheets for all three layers.

Figure 20:
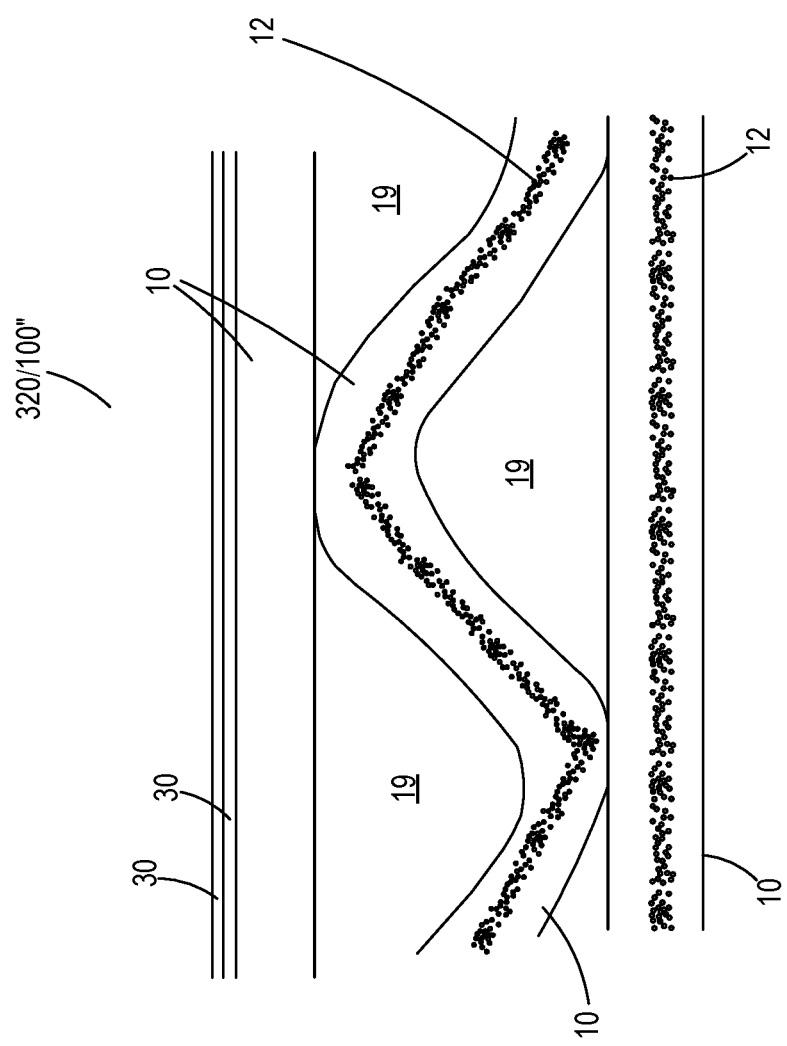
FIG. 20 depicts a corrugated structure of the present invention with one side coated.

A sheet of TL1, EJ, and EK were each coated with Kaolin clay formulation 127-01, then dried, and then coated with 137-02 (BiLite (BASF)—bismuth oxychloride coated mica flakes) and dried. More uncoated sheets were steamed and fluted, and similar corrugated structures were produced incorporating one of the coated sheets with the coating side facing out as depicted in FIG. 20.

10 cm diameter disks were cut of each sample, and mounted into a cooler window for thermal testing. Prior to sealing with marine adhesive, the samples were gently pushed into the front of the cooler window so that the face of the composite was flush with the front of the cooler. 10 cm discs of the following were also cut as controls: Aluminized bubble wrap, corrugated C-flute (35 lbs·MSQ kraft liners with 23 lb medium, Corrugated Supplies Inc.), corrugated B-flute (35 lbs·MSQ kraft liners with 23 lb medium, Corrugated Supplies Inc.), triple wall corrugated B-C flute (35 lbs·MSQ kraft liners with 23 lb medium, Corrugated Supplies Inc.)

Because these samples had significant thickness, temperature rise was monitored over an initial period of time until three consecutive 15-minute temperature readings showed an increase in temperature within +/−0.1° C. of each other. Upon attaining consistent temperature increase readings over 15 minutes, this was designated as pseudo-steady state. The temperature of the outside lamp-facing surface was also measured using a hand-held pyrometric infra-red thermometer, taking care to try not to allow reflections of the hot lamp from interfering. Usually, a pseudo-steady state situation of incremental temperature increases was established within 15 minutes of run time.

Results of Controls

|  | Paper | | | |
| --- | --- | --- | --- | --- |
|  | corrugate C-Flute | corrugate B-Flute | Corrugate BC Flute | Bubblewrap Aluminized |
| Ave. Thickness/mm | 4 | 3.175 | 6.35 | 3.175 |
| Coating 1 | — | — | — | — |
| Coating 2 (lamp facing) | — | — | — | — |
| 1hr Water T Rise/° C. | 3.04 | 3.2 | 2.8 | 1.4 |
| Ave temp difference outer face of window vs. water/° C. | 96.4 | 91.1 | 133.8 | Very noisy data. 74 +/− 25° C. |
| $W \cdot m^{-2}$ | 203 | 214 | 187 | 94 |

| Paper | corrugate Control TL1 | corrugate Flake Perl. EJ | corrugate Gls Bubls EK | corrugate Coated TL1 | corrugate Flk Perl. EJ | corrugate Gls Bubls EK |
| --- | --- | --- | --- | --- | --- | --- |
| Av. Thkns/mm | 3.87 | 5.51 | 5.68 | 4.11 | 5.44 | 6.36 |
| Coating 1 | — | — | — | 127-01 | 127-01 | 127-01 |
| Coat. 2 (lamp) | — | — | — | 137-02 | 137-02 | 137-02 |
| 1 hr T Rise/° C. | 2.4 | 2.13 | NT* | 2 | 1.73 | 1.8 |
| Av. Delta T outer face of window vs. water/° C. | 78.5 | 87.1 | NT* | 74.2 | 86.2 | 77.5 |
| $W \cdot m^{-2}$ | 154 | 143 |  | 134 | 116 | 120 |

*Structure failed during testing—delaminated

These data demonstrate the additive combination of addressing both radiative heat transfer as well as conductive heat transfer.

The present invention is described above and further illustrated below by way of claims, which are not to be construed in any way as imposing limitations upon the scope of the invention. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

What is claimed is:

1. An insulated paper product comprising:
    one or more paper layers; and
    an insulating coating on at least one outer surface of said one or more paper layers, said insulating coating comprising (i) one or more insulating materials comprising bismuth oxychloride, mica, bismuth oxychloride-coated mica, zinc oxide, aluminum-doped zinc oxide, zinc sulfide, cadmium sulfide, bismuth vanadate, gypsum, sericite, powdered silicon, silver-coated glass bubbles, aluminum oxide, hollow polymeric microsphere pigments, or any mixture or combination thereof, and (ii) a binder,
    wherein said insulating coating comprises two or more coating layers with each coating layer comprising said insulating material and said binder, and
    wherein said two or more coating layers comprise (i) a first coating applied onto the one or more paper layers and comprising zinc oxide, aluminum-doped zinc oxide, or any mixture or combination thereof, and (ii) a second coating applied onto the first coating and comprising bismuth oxychloride, bismuth oxychloride-coated mica, or any mixture or combination thereof.

2. The insulated paper product of claim 1, wherein the one or more paper layers comprises a single paper layer.

3. The insulated paper product of claim 1, wherein the one or more paper layers comprises two or more paper layers.

4. The insulated paper product of claim 1, wherein the insulating coating comprises one or more insulating materials comprising bismuth oxychloride, mica, zinc oxide, bismuth oxychloride-coated mica, zinc sulfide, cadmium sulfide, bismuth vanadate, sericite, or any mixture or combination thereof.

5. The insulated paper product of claim 1, wherein the insulating coating comprises one or more insulating materials comprising bismuth oxychloride, mica, zinc oxide, bismuth oxychloride-coated mica, or any mixture or combination thereof.

6. The insulated paper product of claim 1, wherein the insulating coating comprises from about 50.0 weight percent (wt %) to about 99.9 wt % of the one or more insulating materials and from about 50.0 wt % to about 0.1 wt % of the binder.

7. The insulated paper product of claim 1, wherein the insulating coating comprises from about 90.0 wt % to about 99.9 wt % of the one or more insulating materials and from about 10.0 wt % to about 0.1 wt % of the binder.

8. The insulated paper product of claim 1, wherein the binder comprises a latex binder.

9. The insulated paper product of claim 1, further comprising a treatment to impart water or grease resistance to the insulated paper product.

10. The insulated paper product of claim 1, wherein the insulated paper product has an overall basis weight of less than about 200.0 grams per square meter (gsm).

11. The insulated paper product of claim 1, wherein the insulated paper product has an overall basis weight ranging from about 50.0 gsm to about 150.0 gsm.

12. The insulated paper product of claim 1, wherein the insulated paper product comprises a corrugated paper product.

13. The insulated paper product of claim 1, wherein the insulated paper product comprises (i) a first linerboard layer comprising one or more first paper layers, (ii) a second linerboard layer comprising one or more second paper layers, and (iii) a fluted paper layer comprising one or more fluted paper layers positioned between the first linerboard layer and the second linerboard layer, and (I) each of (i) said first linerboard layer, (ii) said second linerboard layer, and (iii) said fluted paper layer may independently comprise insulating material therein or thereon, and (II) said insulating coating is present on (i) an outer surface of said first linerboard layer, (ii) an outer surface of said second linerboard layer, or (iii) both (i) and (ii).

14. The insulated paper product of claim 1, wherein the insulated paper product further comprises one or more additional non-paper layers comprising a gypsum layer, a clay-containing layer, a polymer coating, a pigment-containing layer, a fabric layer, a fiber-reinforcement layer, a second layer of insulating material, a metal film layer, a foam layer, or any combination thereof.

15. The insulated paper product of claim 1, wherein the insulated paper product is molded to form a three-dimensional object.

16. A storage container comprising the insulated paper product of claim 1, said storage container comprising an insulating wrapper for a food item.

17. A method of using the insulated paper product of claim 1, said method comprising:
insulating an object via the insulated paper product.

18. The method of claim 17, wherein the object is a food item.

19. The method of claim 18, wherein the insulated paper product comprises an insulating wrapper for a food item.

* * * * *